US009979813B2

(12) United States Patent
Pandurangarao

(10) Patent No.: US 9,979,813 B2
(45) Date of Patent: May 22, 2018

(54) MOBILE DEVICE COMMUNICATION ACCESS AND HANDS-FREE DEVICE ACTIVATION

(71) Applicant: Allstate Solutions Private Limited, Bangalore (IN)

(72) Inventor: Anil Kumar Pandurangarao, Karnataka (IN)

(73) Assignee: Allstate Solutions Private Limited, Bangalore (IN)

( * ) Notice: Subject to any disclaimer, the term of this patent is extended or adjusted under 35 U.S.C. 154(b) by 0 days. days.

(21) Appl. No.: 15/284,801

(22) Filed: Oct. 4, 2016

(65) Prior Publication Data

US 2018/0097928 A1 Apr. 5, 2018

(51) Int. Cl.
*H04M 3/42* (2006.01)
*H04M 1/725* (2006.01)
(Continued)

(52) U.S. Cl.
CPC ....... *H04M 1/72577* (2013.01); *B60R 16/023* (2013.01); *B60W 40/08* (2013.01);
(Continued)

(58) Field of Classification Search
CPC ............. H04M 1/72577; H04M 3/436; H04M 1/6075; H04M 1/663; H04M 1/72552;
(Continued)

(56) References Cited

U.S. PATENT DOCUMENTS 5,467,388 A 11/1995 Redd, Jr. et al.
5,499,182 A 3/1996 Dusborne
(Continued)

FOREIGN PATENT DOCUMENTS

| EP | 0700009 A2 | 3/1996 |
| JP | 2015169472 A | 9/2015 |
| WO | 2011004372 A1 | 1/2011 |

OTHER PUBLICATIONS

Shabeer, et. al, "Mobile Communication Safety on Road Transport," WSEAS Transactions on Communications, E-ISSN: 2224-2864, Issue 3, vol. 12, Mar. 2013, 12 pages.
(Continued)

*Primary Examiner* — Kwasi Karikari
(74) *Attorney, Agent, or Firm* — Banner & Witcoff, Ltd.

(57) ABSTRACT

Apparatuses, systems, and methods are provided for analyzing an incoming telephonic event (e.g., call, message, and/or notification) to a mobile device during operation of a vehicle in relation to a combination of factors to determine if the incoming telephonic event is to be allowed to be received during vehicle operation. The mobile device associated with a driver of the vehicle may receive the incoming telephonic event during operation of the vehicle. An incoming telephonic event analysis application operating on the mobile device may apply a soft block preventing the incoming telephonic event from being displayed on the mobile device. Based on the incoming telephonic event data, vehicle operational data, user preferences, hands-free device activation, and driver and road ratings, the incoming telephonic event analysis application may determine whether or not to maintain the soft block or allow the incoming telephonic event to be displayed on the mobile device during operation of the vehicle.

15 Claims, 10 Drawing Sheets

(51) Int. Cl.
| | |
|---|---|
| *H04W 68/00* | (2009.01) |
| *H04W 76/02* | (2009.01) |
| *H04W 4/02* | (2018.01) |
| *H04M 1/60* | (2006.01) |
| *B60R 16/023* | (2006.01) |
| *B60W 40/08* | (2012.01) |

(52) U.S. Cl.
CPC ....... *H04M 1/6091* (2013.01); *H04M 1/7253* (2013.01); *H04M 1/72569* (2013.01); *H04M 1/72597* (2013.01); *H04W 4/027* (2013.01); *H04W 68/005* (2013.01); *H04W 76/023* (2013.01)

(58) Field of Classification Search
CPC ....... H04M 2203/651; H04M 2250/02; H04M 3/42136; H04M 1/271; H04M 1/72572; H04M 2250/52; H04W 48/08; H04W 4/027; H04W 84/005
See application file for complete search history.

(56) References Cited

U.S. PATENT DOCUMENTS

| | | | |
|---|---|---|---|
| 5,619,568 A | 4/1997 | Miller | |
| 6,175,803 B1 | 1/2001 | Chowanic et al. | |
| 6,233,445 B1 | 5/2001 | Boltz et al. | |
| 6,351,698 B1 | 2/2002 | Kubota et al. | |
| 6,629,029 B1 | 9/2003 | Giles | |
| 7,167,787 B2 | 1/2007 | Bastian et al. | |
| 7,292,152 B2 | 11/2007 | Torkkola et al. | |
| 7,535,344 B2 | 5/2009 | Obradovich | |
| 7,565,230 B2 | 7/2009 | Gardner et al. | |
| 7,659,827 B2 | 2/2010 | Gunderson et al. | |
| 7,742,792 B2 | 6/2010 | Matsui | |
| 8,090,598 B2 | 1/2012 | Bauer et al. | |
| 8,270,933 B2 | 9/2012 | Riemer et al. | |
| 8,275,348 B2 | 9/2012 | Yen et al. | |
| 8,311,858 B2 | 11/2012 | Everett et al. | |
| 8,314,708 B2 | 11/2012 | Gunderson et al. | |
| 8,332,242 B1 | 12/2012 | Medina, III | |
| 8,355,818 B2 | 1/2013 | Nielsen et al. | |
| 8,489,433 B2 | 7/2013 | Altieri et al. | |
| 8,508,353 B2 | 8/2013 | Cook et al. | |
| 8,538,687 B2 | 9/2013 | Plocher et al. | |
| 8,606,512 B1 | 12/2013 | Bogovich et al. | |
| 8,612,139 B2 | 12/2013 | Wang et al. | |
| 8,620,575 B2 | 12/2013 | Vogt et al. | |
| 8,626,444 B2 | 1/2014 | Li et al. | |
| 8,655,965 B2 | 2/2014 | McWithey et al. | |
| 8,682,699 B2 | 3/2014 | Collins et al. | |
| 8,686,872 B2 | 4/2014 | Szczerba et al. | |
| 8,712,429 B2 | 4/2014 | Nagorniak | |
| 8,731,768 B2 | 5/2014 | Fernandes et al. | |
| 8,744,492 B2 | 6/2014 | Kuo | |
| 8,805,707 B2 | 8/2014 | Schumann, Jr. et al. | |
| 8,810,425 B2 | 8/2014 | Hyde et al. | |
| 8,824,997 B2 | 9/2014 | Gehlen et al. | |
| 8,860,564 B2 | 10/2014 | Rubin et al. | |
| 8,930,229 B2 | 1/2015 | Bowne et al. | |
| 8,971,927 B2 | 3/2015 | Zhou et al. | |
| 9,020,749 B2 | 4/2015 | Aso et al. | |
| 9,020,751 B1 | 4/2015 | Bogovich et al. | |
| 9,066,210 B2 | 6/2015 | Kalita et al. | |
| 9,082,072 B1 | 7/2015 | Wedding, Jr. et al. | |
| 9,142,142 B2 | 9/2015 | Nath et al. | |
| 9,150,154 B2 | 10/2015 | Miller et al. | |
| 9,207,675 B1 | 12/2015 | Walser et al. | |
| 9,519,670 B2 | 12/2016 | Stanek et al. | |
| 9,574,888 B1 | 2/2017 | Hu et al. | |
| 2002/0059084 A1 | 5/2002 | Wahlbin et al. | |
| 2004/0210353 A1 | 10/2004 | Rice | |
| 2004/0214615 A1 | 10/2004 | Entenmann et al. | |
| 2006/0053038 A1 | 3/2006 | Warren et al. | |
| 2006/0200008 A1 | 9/2006 | Moore-Ede | |
| 2006/0247852 A1 | 11/2006 | Kortge et al. | |
| 2007/0027726 A1 | 2/2007 | Warren et al. | |
| 2007/0136107 A1 | 6/2007 | Maguire et al. | |
| 2007/0226014 A1 | 9/2007 | Alemayehu et al. | |
| 2007/0268158 A1 | 11/2007 | Gunderson et al. | |
| 2008/0065427 A1 | 3/2008 | Helitzer et al. | |
| 2008/0120175 A1 | 5/2008 | Doering | |
| 2008/0243321 A1 | 10/2008 | Walser et al. | |
| 2008/0243558 A1 | 10/2008 | Gupte | |
| 2008/0255722 A1 | 10/2008 | McClellan et al. | |
| 2008/0255888 A1 | 10/2008 | Berkobin et al. | |
| 2008/0262670 A1 | 10/2008 | McClellan et al. | |
| 2008/0270519 A1 | 10/2008 | Ekdahl et al. | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0132294 A1 | 5/2009 | Haines | |
| 2010/0030582 A1 | 2/2010 | Rippel et al. | |
| 2010/0030592 A1 | 2/2010 | Evans et al. | |
| 2010/0042314 A1 | 2/2010 | Vogt et al. | |
| 2010/0063850 A1 | 3/2010 | Daniel | |
| 2010/0131303 A1 | 5/2010 | Collopy et al. | |
| 2010/0131304 A1 | 5/2010 | Collopy et al. | |
| 2010/0157061 A1 | 6/2010 | Katsman et al. | |
| 2010/0174566 A1 | 7/2010 | Helitzer et al. | |
| 2010/0205012 A1 | 8/2010 | McClellan | |
| 2010/0211259 A1 | 8/2010 | McClellan | |
| 2010/0238009 A1 | 9/2010 | Cook et al. | |
| 2010/0250021 A1 | 9/2010 | Cook et al. | |
| 2010/0323673 A1* | 12/2010 | Etram | H04M 1/663 455/414.1 |
| 2011/0009107 A1 | 1/2011 | Guba et al. | |
| 2011/0039581 A1 | 2/2011 | Cai et al. | |
| 2011/0090221 A1 | 4/2011 | Ren | |
| 2011/0092159 A1* | 4/2011 | Park | H04L 63/102 455/41.2 |
| 2011/0106370 A1 | 5/2011 | Duddle et al. | |
| 2011/0144909 A1 | 6/2011 | Ren et al. | |
| 2011/0196571 A1 | 8/2011 | Foladare et al. | |
| 2011/0205043 A1 | 8/2011 | Fujiki et al. | |
| 2011/0213628 A1 | 9/2011 | Peak et al. | |
| 2011/0219080 A1* | 9/2011 | McWithey | H04M 1/72552 709/206 |
| 2011/0269441 A1 | 11/2011 | Silver | |
| 2011/0320492 A1 | 12/2011 | Inghelbrecht | |
| 2012/0004933 A1 | 1/2012 | Foladare et al. | |
| 2012/0010906 A1 | 1/2012 | Foladare et al. | |
| 2012/0021386 A1 | 1/2012 | Anderson et al. | |
| 2012/0072243 A1 | 3/2012 | Collins et al. | |
| 2012/0072244 A1 | 3/2012 | Collins et al. | |
| 2012/0083287 A1 | 4/2012 | Casto et al. | |
| 2012/0101855 A1 | 4/2012 | Collins et al. | |
| 2012/0109692 A1 | 5/2012 | Collins et al. | |
| 2012/0123806 A1 | 5/2012 | Schumann, Jr. et al. | |
| 2012/0197669 A1 | 8/2012 | Kote et al. | |
| 2012/0209632 A1 | 8/2012 | Kaminski et al. | |
| 2012/0226421 A1 | 9/2012 | Kote et al. | |
| 2012/0253586 A1 | 10/2012 | Sakakibara | |
| 2012/0289214 A1 | 11/2012 | Hynes et al. | |
| 2012/0311416 A1 | 12/2012 | Richter et al. | |
| 2013/0006674 A1 | 1/2013 | Bowne et al. | |
| 2013/0006675 A1 | 1/2013 | Bowne et al. | |
| 2013/0006715 A1 | 1/2013 | Warkentin et al. | |
| 2013/0024060 A1 | 1/2013 | Sukkarie et al. | |
| 2013/0078963 A1* | 3/2013 | Prasad | H04M 1/663 455/414.1 |
| 2013/0110310 A1 | 5/2013 | Young | |
| 2013/0124082 A1 | 5/2013 | Cho | |
| 2013/0137404 A1 | 5/2013 | Kuo | |
| 2013/0151288 A1 | 6/2013 | Bowne et al. | |
| 2013/0157640 A1 | 6/2013 | Aycock | |
| 2013/0238233 A1 | 9/2013 | Kim et al. | |
| 2013/0317736 A1 | 11/2013 | Fernandes et al. | |
| 2014/0019170 A1 | 1/2014 | Coleman et al. | |
| 2014/0067434 A1 | 3/2014 | Bourne et al. | |
| 2014/0074402 A1 | 3/2014 | Hassib et al. | |
| 2014/0080100 A1 | 3/2014 | Phelan et al. | |
| 2014/0180723 A1 | 6/2014 | Cote et al. | |

(56) References Cited

U.S. PATENT DOCUMENTS

| | | |
|---|---|---|
| 2014/0207497 A1 | 7/2014 | Collins et al. |
| 2014/0257869 A1 | 9/2014 | Binion et al. |
| 2014/0267263 A1 | 9/2014 | Beckwith et al. |
| 2014/0267627 A1 | 9/2014 | Freeman et al. |
| 2014/0268353 A1 | 9/2014 | Fujimura et al. |
| 2014/0277939 A1 | 9/2014 | Ren et al. |
| 2014/0350970 A1 | 11/2014 | Schumann, Jr. et al. |
| 2014/0358840 A1 | 12/2014 | Tadic et al. |
| 2015/0056973 A1 | 2/2015 | Efrati |
| 2015/0112545 A1 | 4/2015 | Binion et al. |
| 2015/0112730 A1 | 4/2015 | Binion et al. |
| 2015/0112800 A1 | 4/2015 | Binion et al. |
| 2015/0172450 A1 | 6/2015 | Singhal |
| 2015/0187016 A1 | 7/2015 | Adams et al. |
| 2016/0047666 A1 | 2/2016 | Fuchs |
| 2016/0050315 A1 | 2/2016 | Malhotra et al. |
| 2016/0073240 A1 | 3/2016 | Helm |
| 2016/0134744 A1 | 5/2016 | de la Fuente Sanchez |

OTHER PUBLICATIONS

"Drive Control—For When you Need a Little More Self Control," retrieved Apr. 8, 2016 from https://drivecontrolapp.com, 2 pages.

Jun. 23, 2017—U.S. Non-Final Office Action—U.S. Appl. No. 15/284,728.

"Telematics: Reinventing Auto Insurance," retrieved Sep. 6, 2011 from http://www.insurancetech.com/blog/archives/2010/03/telematics_the.html, 10 pages.

Axeda and Walsh Vision Announce Alliance for Cloud Telematics Solutions.

Waste Fleet Safety: Influencing Driver Behavior.

Insurance Companies Utilizing Technology.

Jul. 13, 2015 U.S. Non-Final Office Action—U.S. Appl. No. 14/066,988.

Sep. 30, 2015 U.S. Non-Final Office Action—U.S. Appl. No 14/227,740.

Jul. 20, 2015—U.S. Non-Final Office Action—U.S. Appl. No. 13/564,524.

Sep. 30, 2015—U.S. Non-Final Office Action—U.S. Appl. No. 14/227,740.

Sep. 1, 2016—U.S. Final Office Action—U.S. Appl. No. 13/564,524.

Jun. 10, 2016 U.S. Non-Final Office Action—U.S. Appl. No. 14/066,988.

Nov. 22, 2016—U.S. Final Office Action—U.S. Appl. No. 14/066,988.

Mar. 28, 2016—U.S. Non-Final Office Action—U.S. Appl. No. 13/564,524.

Nov. 23, 2015—U.S. Final Office Action—U.S. Appl. No. 13/564,524.

Feb. 4, 2014—U.S. Final Office Action—U.S. Appl. No. 13/564,524.

Oct. 8, 2013—U.S. Non-Final Office Action—U.S. Appl. No. 13/564,524.

Mar. 23, 2016—U.S. Final Office Action—U.S. Appl. No. 14/227,740.

Jan. 31, 2017—U.S. Non-Final Office Action—U.S. Appl. No. 14/227,740.

Nov. 23, 2015—U.S. Final Office Action—U.S. Appl. No. 14/066,988.

"Continental Head-up Display Augmented Reality HUD" http://continental-head-up-display.com/ website last visited on Apr. 30, 2015.

"In the Future, Your Car's Windscreen Will Be an Augmented Reality Display" https://transportevolved.com/2014/09/29/future-cars-windscreen-will-augmented-reality-display/ website last visited on Apr. 30, 2015.

"Autonomous Cars from Berlin" website: http://autonomos-labs.com/research/ website last visited on Apr. 30, 2015.

Williams, Geoff—Should You Try Pay-As-You-Drive Insurance?, Jan. 13, 2014, http://money.usnews.com/money/personal-finance/articles/2014/01/13/should-you-try-pay-as-you-drive-insurance, U.S. News & World Report.

Rafter, Michelle—Use-Based Insurance Shifts Into High Gear, http://www.edmunds.com/auto-insurance/pay-as-you-drive-insurance-goes-into-high-gear.html, Feb. 27, 2014, Edmunds.

Chalon Smith, Mark—Pay-As-You-Drive Discounts: A Guide, http://www.insurance.com/auto-insurance/saving-money/low-mileage-discounts-guide.html, Apr. 22, 2015, Insurance.com.

How's My Driving?—http://www.economist.com/news/finance-and-economics/21572237-gizmos-track-driving-habits-me-changing-face-car-insurance-hows-my—Feb. 23, 2013—Print Edition of The Economist.

Usage-Based Insurance and Telematics, http://www.naic.org/cipr_topics/topic_usage_based_insurance.htm, Last Updated Dec. 14, 2015—National Association of Insurance Commissioners & The Center for Insurance Policy and Research.

Dewri, Rinku et al—Inferring Trip Destinations From Driving Habits Data, http://www.cs.du.edu/~rdewri/data/MyPapers/ Conferences/2013WPES-Extended.pdf, Last Visited Feb. 25, 2016.

Rosolino, V. et al: "Road Safety Performance Assessment: A New Road Network Risk Index for Info Mobility", ScienceDirect: Procedia—Social and Behavioral Sciences 111 (2014) pp. 624-633.

Li, Z et. al.: "Road Risk Modeling and Cloud-Aided Safety-Based Route Planning", Published in Cybernetics, IEEE Translations dated Oct. 2, 2015, pp. 1-2.

"Road Asset Management", https://www.arrb.com/au/Infrastructure/Road-asset-management.aspx, Last visited Oct. 8, 2015, pp. 1-5.

Dec. 5, 2016 (WO)—International Search Report and Written Opinion—App. PCT/US2016/052877.

Feb. 2, 2017—(WO) International Search Report—App PCT/US2016/063527.

May 19, 2017 (WO) International Search Report and Written Opinion—PCT/IN2016/50370.

Jun. 6, 2017—U.S. Non-Final Office Action—U.S. Appl. No. 13/564,524.

Jun. 7, 2017—U.S. Final Office Action—U.S. Appl. No. 14/227,740.

May 19, 2017 (WO) International Search Report and Written Opinion—App. PCT/IN2016/050370.

May 24, 2017—(WO) International Search Report and Written Opinion—PCT/IN16/50369.

Nov. 16, 2017—U.S. Non-Final Office Action—U.S. Appl. No. 14/863,476.

Nov. 22, 2017—U.S. Notice of Allowance—U.S. Appl. No. 15/284,728.

Sep. 12, 2017—U.S. Final Office Action—U.S. Appl. No. 13/564,524.

Sep. 13, 2017—U.S. Non-Final Office Action—U.S. Appl. No. 14/066,988.

\* cited by examiner

MOBILE DEVICE COMMUNICATION ACCESS AND HANDS-FREE DEVICE ACTIVATION

CROSS REFERENCE TO RELATED APPLICATIONS

This application is related to U.S. application Ser. No. 13/564,524 entitled, "Calculation and Utilization of a Driving Score," and U.S. application Ser. No. 15/052,291 entitled, "Risk Maps." Both of these applications are incorporated herein by reference in their entirety.

FIELD

Aspects described herein generally relate to one or more computer systems, servers, and/or other devices including hardware and/or software. More specifically, aspects relate to analyzing an incoming telephonic event (e.g., call, message, and/or notification) to a mobile device in relation to a combination of vehicle operational data, user preferences, and hands-free device activation to determine if the incoming telephonic event is to be permitted to be received (e.g., by a user) during vehicle operation.

BACKGROUND

Distracted driving can lead to motor vehicle accidents, which may result in injury and, in some cases death. One contributing factor to distracted driving is mobile device interaction, particularly through telephone calls, text messages, and social media applications. While mobile applications and hands-free devices currently exist which purport preventing and/or minimizing direct mobile device interaction during driving, such mobile applications and hands-free devices are limited by technological shortcomings which hinder their effectiveness in reducing distracted driving in a safe manner.

For example, in regard to mobile applications, such applications are, in some instances, comprehensively restrictive and prevent all incoming calls, messages, and notifications from being provided to a mobile device of a driver until after driving has stopped. Accordingly, emergency calls, messages, and notifications may be prohibited from reaching the driver in a timely fashion in fitting with an emergency situation. Moreover, in other instances in which the mobile applications restrict the presentation of incoming calls, messages, and notifications based on a velocity of the vehicle as determined through a GPS and/or accelerometer of the mobile device, the determined velocity readings can be subverted through restricting GPS privileges of the mobile application and/or travelling at a constant speed through vehicle cruise control utilization.

With respect to hands-free devices, in some instances, such devices are configured to audibly and/or visually generate all incoming calls, messages, and notifications for the user. However, it has been shown that the audibilization and/or visualization of content do not significantly reduce distracted driving as compared to conventional mobile device usage. Additionally, in other instances in which only certain incoming calls, messages, and notifications are audibly and/or visually generated for the user, the determination is made based on pre-stored user selections that do not take into consideration criteria such as traffic levels, environmental conditions, time of day, type of road, and emergency calls, messages, and notifications.

As such, in order to address the technological shortcomings mentioned above, there may exist a need for applications, apparatuses, and systems which analyze an incoming telephonic event to a mobile device in relation to a combination of vehicle telematics data, user preferences, and hands-free device activation to determine if the incoming telephonic event is to be presented at the mobile device during vehicle operation.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to methods, apparatuses, and systems configured to analyze an incoming telephonic event in relation to a combination of vehicle operational data, user preferences, and hands-free device activation to determine if the incoming telephonic event is to be presented during vehicle operation.

Some aspects described herein provide for an auto-reply system for a mobile device associated with a driver of a vehicle. The mobile device may be configured to receive an incoming telephonic event during operation of the vehicle. An incoming telephonic event analysis application operating on the mobile device may be configured to apply a soft block to the incoming telephonic event and at least temporarily prevent the event from being displayed on the mobile device. In one embodiment, after applying the soft block, the incoming telephonic event analysis application may be configured to analyze vehicle operational data and user preferences to determine whether or not to remove the soft block and allow the incoming telephonic event to be displayed on the mobile device. In another embodiment, the incoming telephonic event analysis application may be configured to analyze a calculated driver score and a calculated road risk score to determine whether or not to remove the soft block and allow the incoming telephonic event to be displayed on the mobile device.

In the event that the incoming telephonic event analysis application determines not to allow the incoming telephonic event to be displayed on the mobile device (e.g., to prevent the incoming telephonic event from being displayed on the mobile device), the incoming telephonic event analysis application may be configured to maintain the soft block until operation of the vehicle is terminated and to provide an auto-reply to the provider of the incoming telephonic event that the driver associated with the mobile device is unable to respond to the telephonic event. In the event that the incoming telephonic event analysis application determines to permit the incoming telephonic event to be displayed on the mobile device, the incoming telephonic event analysis application may remove the soft block.

Other aspects described herein provide for a hands-free device activation system including a mobile device associated with a driver of a vehicle. The mobile device may be configured to launch the incoming telephonic event analysis application responsive to a user input or an ignition event associated with the vehicle of the driver. After launching, the incoming telephonic event analysis application may be configured to instruct the mobile device to sync and/or pair with a proximate hands-free device. During operation of the vehicle, the mobile device may receive an incoming telephonic event. The incoming telephonic event analysis application operating on the mobile device may be configured to apply a soft block to the incoming telephonic event and at least temporarily prevent the event from being displayed on the mobile device.

In one embodiment, after applying the soft block, the incoming telephonic event analysis application may be configured to analyze vehicle operational data and user preferences to determine whether or not to remove the soft block and allow the incoming telephonic event to be displayed on the mobile device. In another embodiment, the incoming telephonic event analysis application may be configured to analyze a calculated driver score and a calculated road risk score to determine whether or not to remove the soft block and allow the incoming telephonic event to be displayed on the mobile device.

In the event that the incoming telephonic event analysis application determines not to allow the incoming telephonic event to be displayed on the mobile device, the incoming telephonic event analysis application may be configured to maintain the soft block until operation of the vehicle is terminated and/or to provide an auto-reply to the provider of the incoming telephonic event that the driver associated with the mobile device is unable to respond to the telephonic event. In the event that the incoming telephonic event analysis application determines to allow the incoming telephonic event to be displayed on the mobile device, the incoming telephonic event analysis application may remove the soft block, activate the hands-free device, and transmit the incoming telephonic event to the activated hands-free device.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
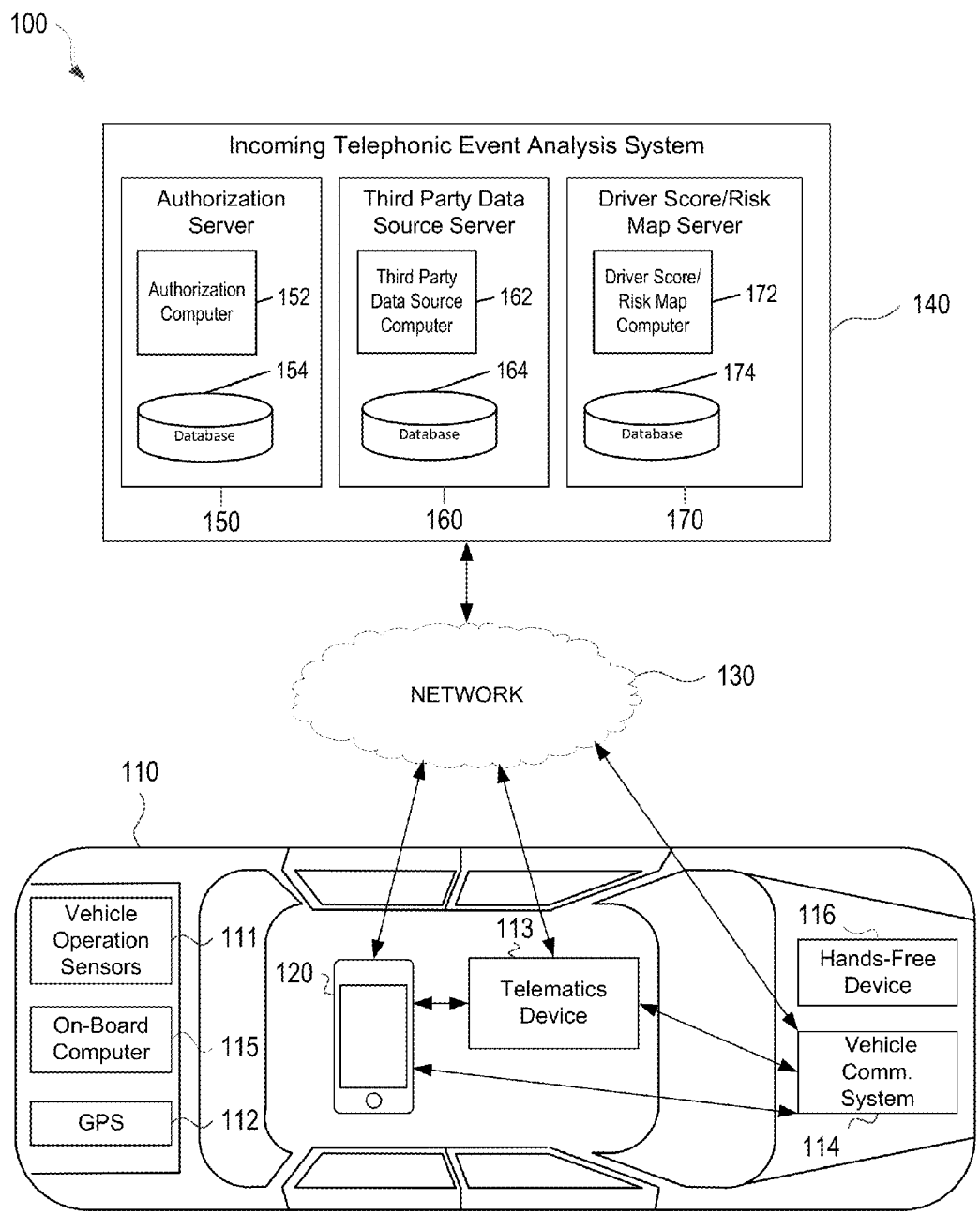
FIG. 1 depicts an example auto-reply and hands-free system according to one or more aspects of the present disclosure.

FIG. 1 is a diagram illustrating various example components of an auto-reply and hands-free system 100 according to one or more aspects of the disclosure. Auto-reply and hands-free system 100 may include a vehicle 110, a mobile computing device 120, a network 130, and an incoming telephonic event analysis system 140. Each component shown in FIG. 1 may be implemented in hardware, software, or a combination of the two. Additionally, each component of the auto-reply and hands-free system 100 may include a computing device (or system) having some or all of the structural components described below in regard to computing device 801 of FIG. 8.

Vehicle 110 of the auto-reply and hands-free system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some examples, vehicle 110 may include vehicle operation/performance sensors 111 capable of detecting, recording, and transmitting various vehicle performance and/or operational data and environmental conditions data. For example, sensors 111 may detect, store, and transmit data corresponding to the vehicle's speed, rates of acceleration and/or deceleration, braking, swerving, and the like. Sensors 111 also may detect, store and/or transmit data received from the vehicle's internal systems, such as impact to the body of the vehicle, air bag deployment, headlight usage, brake light operation, door opening and closing, door locking and unlocking, cruise control usage, hazard light usage, windshield wiper usage, horn usage, turn signal usage, seat belt usage, phone and radio usage within the vehicle, internal decibel levels, and other data collected by the vehicle's computer systems.

Sensors 111 also may detect, store, and/or transmit data relating to moving violations and the observance of traffic signals and signs by the vehicle 110. Additional sensors 111 may detect, store, and transmit data relating to the maintenance of the vehicle 110, such as the engine status, oil level, engine coolant temperature, odometer reading, the level of fuel in the fuel tank, engine revolutions per minute (RPMs), and/or tire pressure.

The sensors 111 of vehicle 110 may further include one or more cameras and proximity sensors capable of recording additional conditions inside or outside of the vehicle 110. Internal cameras may detect conditions such as the number of the passengers in the vehicle 110, and potential sources of driver distraction within the vehicle (e.g., pets, phone usage, and unsecured objects in the vehicle). External cameras and proximity sensors may be configured to detect environmental conditions data such as nearby vehicles, vehicle spacing, traffic levels, road conditions, traffic obstructions, animals, cyclists, pedestrians, precipitation levels, light levels, sun position, and other conditions that may factor into driving operations of vehicle 110.

Additionally, vehicle sensors 111 may be configured to independently transmit the above-mentioned data to one or more internal computing systems including on-board computer 115, as well as one or more external computing systems such as telematics device 113, mobile device 120, and/or incoming telephonic event analysis system 140. In some instances, the data transmission to the one or more external computing systems may be performed via on-board computer 115. In such cases, the on-board computer 115 may be configured to transmit the data received from vehicle sensors 111 to telematics device 113, mobile device 120, and/or incoming even analysis system 140 by way of vehicle communication system 114.

Vehicle 110 may include a Global Positioning System (GPS) 112 which may be used to generate data corresponding to the position and/or location of vehicle 110. GPS 112 may be configured to independently transmit the above-mentioned data to one or more internal computing systems including on-board computer 115, as well as one or more external computing systems such as telematics device 113, mobile device 120, and/or incoming telephonic event analysis system 140. In some instances, the data transmission to the one or more external computing systems may be performed via on-board computer 115. In such cases, the on-board computer 115 may be configured to transmit the data received from GPS 112 to telematics device 113, mobile device 120, and/or incoming even analysis system 140 by way of vehicle communication system 114.

Telematics device 113 may be configured to receive vehicle performance and/or operational data and environmental conditions data in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110 through which on-board computer 115 may be configured to transmit data to telematics device 113. In certain embodiments, telematics device 113 may be configured to receive vehicle performance and/or operational data and environmental conditions data directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

The vehicle performance and/or operational data may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO IS09141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited, an accelerometer, compass, gyroscope, and GPS. Additionally, telematics device 113 may include antennas to communicate with other devices wirelessly. For example, telematics device 113 may communicate with on-board computer 115, mobile device 120, and/or incoming telephonic event analysis system 140 over a wide area network (WAN), cellular network, Wi-Fi network, and the like. Telematics device 113 may also communicate with on-board computer 115 and mobile device 120 via a Bluetooth connection. In certain embodiments, telematics device 113 may be configured to establish a secure communication link and/or channel with on-board computer 115, mobile device 120, and/or incoming telephonic event analysis system 140.

In some arrangements, telematics device 113 may be a telematics application operating on mobile computing device 120 and may utilize hardware components comprised within mobile computing device 120 (e.g., memory, processors, communication hardware, etc.) to receive, store, and/or transmit vehicle performance and/or operational data and environmental conditions data.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, etc.) to facilitate near field communication (NFC) and/or radio-frequency identification (RFID), while in other examples the communication systems 114 may be implemented using existing vehicle hardware components (e.g., radio and satellite equipment, navigation computers). In some instances, the vehicle communication systems 114 may be configured to transmit and receive data from vehicle sensors 111, GPS 112, telematics device 113, on-board computer 115, mobile device 120, and/or telephonic event analysis system 140 over a wide area network (WAN), cellular network, Wi-Fi network, Bluetooth, RFID, and/or NFC.

Figure 8:
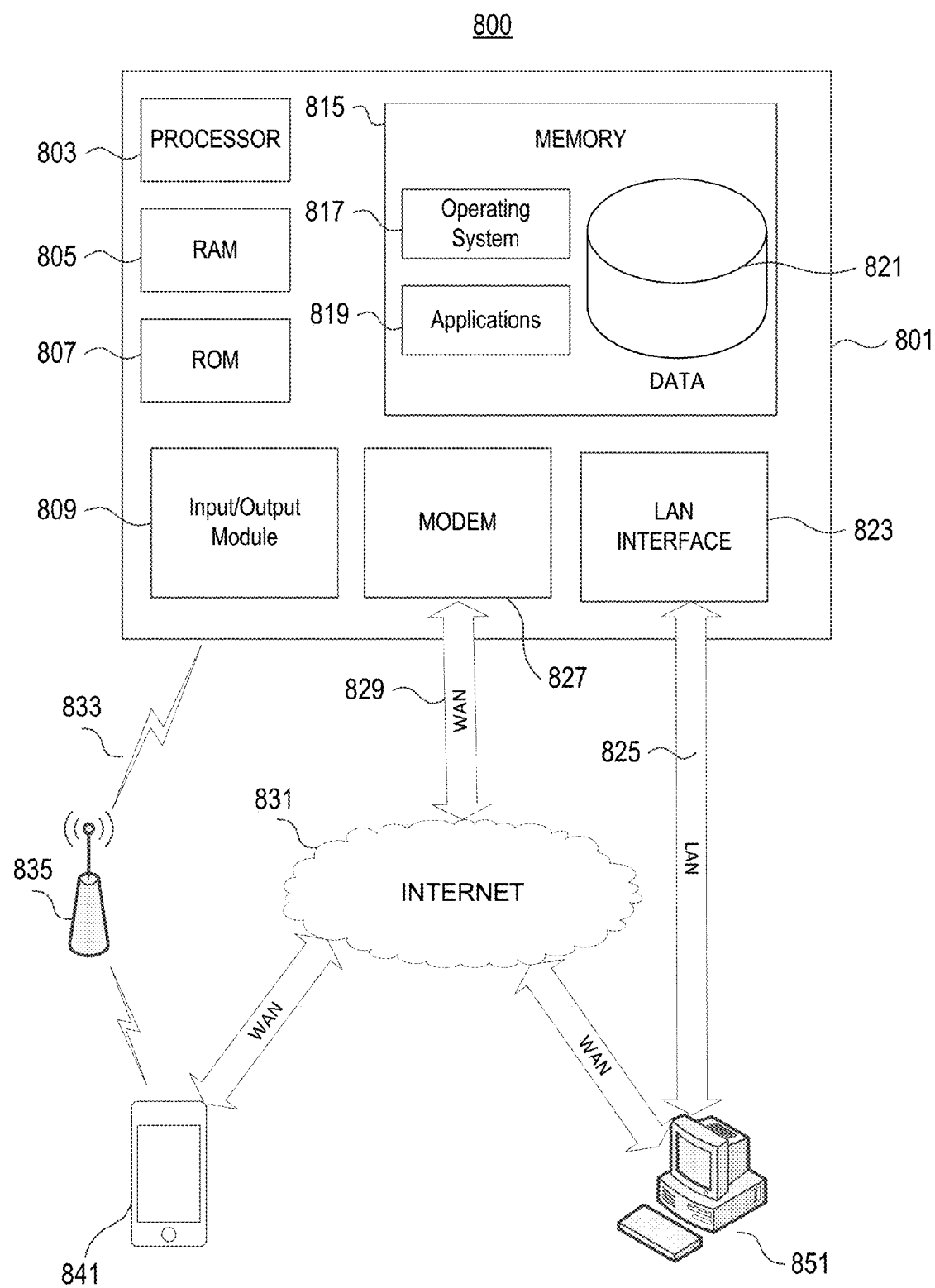
FIG. 8 illustrates an example network environment and computing systems that may be used to implement aspects of the disclosure.

Vehicle control computer 115 may contain some or all of the hardware/software components as the computing device 801 of FIG. 8, and may be configured to operate aspects of the driving, or other operation of vehicle 110, including but not limited to, acceleration, braking, steering, and/or route navigation. Furthermore, vehicle control computer 115 may be configured to operate one or more internal vehicle systems and/or components including at least a vehicle sound system, dashboard display and/or heads-up display system, hands-free system including input microphone and output speakers, interior lighting system, climate control system, ignition system, door locking system, and the like. Similarly, vehicle control computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to perform the incoming telephonic event analysis methods as described in further detail below in conjunction with mobile computing device 120 and/or incoming telephonic event analysis system 140.

Mobile computing device 120 may be, for example, a mobile phone, personal digital assistant (PDA), or tablet computer associated with the driver or passenger(s) of vehicle 110. As such, mobile computing device 120 may be included within the vehicle 110 and, in some instances, may be used to independently collect vehicle driving data and/or to receive vehicle driving or operational/performance data and/or environmental conditions data from one or more internal and/or external computing systems (e.g., vehicle operation sensors 111, GPS 112, telematics device 113, on-board computer 115, telematics device 120, and/or incoming telephonic event analysis system 140). In one example, software applications executing on mobile computing device 120 (e.g., telematics application and/or incoming telephonic event analysis application) may be configured to independently detect driving data and/or to receive vehicle driving data and/or environmental conditions data from one or more internal and/or external computing systems. With respect to independent vehicle data detection and collection, mobile device 120 may be equipped with one or more accelerometers and/or GPS systems which may be accessed by software applications executing on mobile computing device 120 to determine vehicle location, velocity, acceleration, direction, and other driving data. As stated above, mobile computing device 120 may be configured to transmit the independently collected vehicle driving data and/or the received vehicle driving data to one or more internal and/or external computing devices (e.g., on-board computer 115, telematics device 120, and/or incoming telephonic event analysis system 140).

Additionally, mobile computing device 120 may be configured to perform the incoming telephonic event analysis methods as described in further detail below in conjunction with on-board computer 115 and/or incoming telephonic event analysis system 140. In some instances, the incoming telephonic event analysis methods may be performed by a telematics application and/or an incoming telephonic event analysis application operating on mobile device 120. In performing such methods, mobile device 120 may be configured to detect and store data corresponding to an incoming telephonic event, and may be further configured to transmit the incoming telephonic event data to on-board computer 115 and/or incoming telephonic event analysis system 140. Furthermore, mobile device 120 may be configured to receive vehicle operational data, environmental conditions data, and/or data produced during the performance of the incoming telephonic event analysis methods from sensors 111, GPS 112, telematics device 113, on-board computer 115, and/or incoming telephonic event analysis system 140.

In certain embodiments, auto-reply and hands-free system 100 may further include hands-free device 116. Hands-free device 116 may be included within vehicle 110 as a component of on-board computer 115 and/or as a standalone device. In instances in which hands-free device 116 is a standalone device, it may any one of a hands-free headphone, headset, in-ear device, glasses, necklace, watch, and/or bracelet and may also be a hands-free kit comprising at least a computing device, speaker, and microphone. In instances in which hands-free device 116 is included within vehicle 110 as a component of on-board computer 115, hands-free device 116 may be a device, component, and/or system controlled by on-board computer 115. Regardless of the type (e.g., component of on-board computer 115 and/or standalone device), hands-free device 116 may contain some or all of the hardware/software components as the computing device 801 of FIG. 8.

Hands-free device 116 may be configured to sync and/or pair with mobile device 120 in order to facilitate communication between hands-free device 116 and mobile computing device 120. The syncing and/or pairing of hands-free device 116 with mobile computing device 120 may be performed through any one, or combination of, Bluetooth, NFC, RFID, and the like and/or through any one, or combination of, a WAN, cellular network, Wi-Fi network, and the like. Responsive to syncing and/or pairing, communication between hands-free device 116 and mobile device 120 may be conducted through any one, or combination of, a WAN, cellular network, Wi-Fi network, and the like and/or through any one, or combination of, Bluetooth, NFC, and the like.

The auto-reply and hands-free system 100 may include an incoming telephonic event analysis system 140 including an authorization server 150, a third party data source server 160, and a driver risk score/risk map server 170. The incoming telephonic event analysis system 140 and each of the authorization server 150, third party data source server 160, and driver risk score/risk map server 170 may contain some or all of the hardware/software components as the computing device 801 of FIG. 8.

The incoming telephonic event analysis system 140 may be a single server containing some or all of the hardware/software components as the computing device 801 of FIG. 8. In such instances, each of the authorization server 150, third party data source server 160, and the driver risk score/risk map server 170 may be virtual machines operating on the incoming telephonic event analysis system 140. Alternatively, the incoming telephonic event analysis system 140 may be a plurality of servers containing some or all of the hardware/software components as the computing device 801 of FIG. 8. In such instances, each of the authorization server 150, third party data source server 160, and the driver risk score/risk map server 170 may be individualized server entities.

In some instances, the analysis of the incoming telephonic event described in further detail below may be performed by is performed by incoming telephonic event analysis system 140. In such instances, the mobile device 120 may transmit incoming telephonic event to incoming telephonic event analysis system 140. Such data may include the individual or entity associated with incoming telephonic event, time of receipt of the incoming telephonic event, and the type of the incoming telephonic event. Upon receipt of the incoming telephonic event data, incoming telephonic event analysis system 140, alone or in combination, with on-board computer 115 may be able to perform the processes outlined in FIGS. 2-7.

Authorization server 150 may comprise an authorization computer 152 configured to receive, process, and transmit vehicle operational data, environmental conditions data, incoming telephonic event data, user authorization preference data, driver score data, and risk map data to determine whether or not an incoming telephonic event is to be allowed to be received at the mobile device 120 during the operation of vehicle 110. The authorization server 150 may also comprise an authorization database 154 configured to store the above-mentioned data received, processed, and transmitted by authorization computer 152. Authorization server 150 may be configured to receive data from vehicle operation sensors 111, GPS 112, telematics device 113, on-board computer 115, mobile device 120, third party data source server 160, and driver score/risk map server 170. Additionally, authorization server 150 may be configured to transmit data to telematics device 113, on-board computer 115, mobile device 120, third party data source server 160, and driver score/risk map server 170. In some instances, authorization server 150 may be optional and the processes performed by authorization server 150 may be distributed to any one, or combination of, mobile device 120 and on-board computer 115.

The third party data source server 160 may comprise a third party data source computer 162 configured to receive, process, and transmit environmental conditions data associated with a geographic location of vehicle 110 including current weather condition data, forecasted weather condition data, traffic flow data, road closure data, road type data, and/or other data environmental conditions data such as flash flood, earthquake, tsunami, tornado, tropical depression, tropical storm, and hurricane warnings. The third party data source server 160 may also comprise a third party data source database 164 used to store the environmental conditions data collected by the third party data source computer 162. Third party data source server 160 may be configured to receive data from vehicle operation sensors 111, GPS 112, telematics device 113, on-board computer 115, mobile device 120, authorization server 150, and driver score/risk map server 170. Additionally, third party data source server 160 may be configured to transmit data to telematics device 113, on-board computer 115, mobile device 120, authorization server 150, and driver score/risk map server 170. In some instances, authorization server 150 may be optional and the processes performed by authorization server 150 may be distributed to any one, or combination of, mobile device 120 and on-board computer 115.

Driver score/risk map server 170 may comprise a driver score/risk map computer 172 configured to receive and analyze vehicle operational data and environmental conditions data to calculate a driver risk score for a driver of vehicle 110 and a road risk score for a road segment on which vehicle 110 is driving. The calculation of the driver risk score and the road risk score are respectively described in U.S. application Ser. No. 13/564,524 entitled, "Calculation and Utilization of a Driving Score," and U.S. application Ser. No. 15/052,291 entitled, "Risk Maps," both of which are incorporated herein by reference in their entirety. Driver score/risk map server 170 may further include driver score/risk map database 174 to store the calculated driver risk score and the road risk score. In some instances, the driver score/risk map database 174 may also include historical data including insurance claims, accident reports, and historical vehicle operations data and environmental conditions data associated with insurance claims and accident reports. Such data may be utilized by driver score/risk map computer 172 in calculating the driver risk score and the road risk score. Driver score/risk map server 170 may be configured to receive data from vehicle operation sensors 111, GPS 112, telematics device 113, on-board computer 115, mobile device 120, authorization server 150, and third party data source server 160. Additionally, driver score/risk map server 170 may be configured to transmit data to telematics device 113, on-board computer 115, mobile device 120, authorization server 150, and third party data source server 160.

The following steps that are described in regard to FIGS. 2-7 may be implemented by one or more of the components of FIGS. 1 and 8 (described in detail below) and/or other components, including other computing devices configured to perform the functions described herein.

Figure 2:
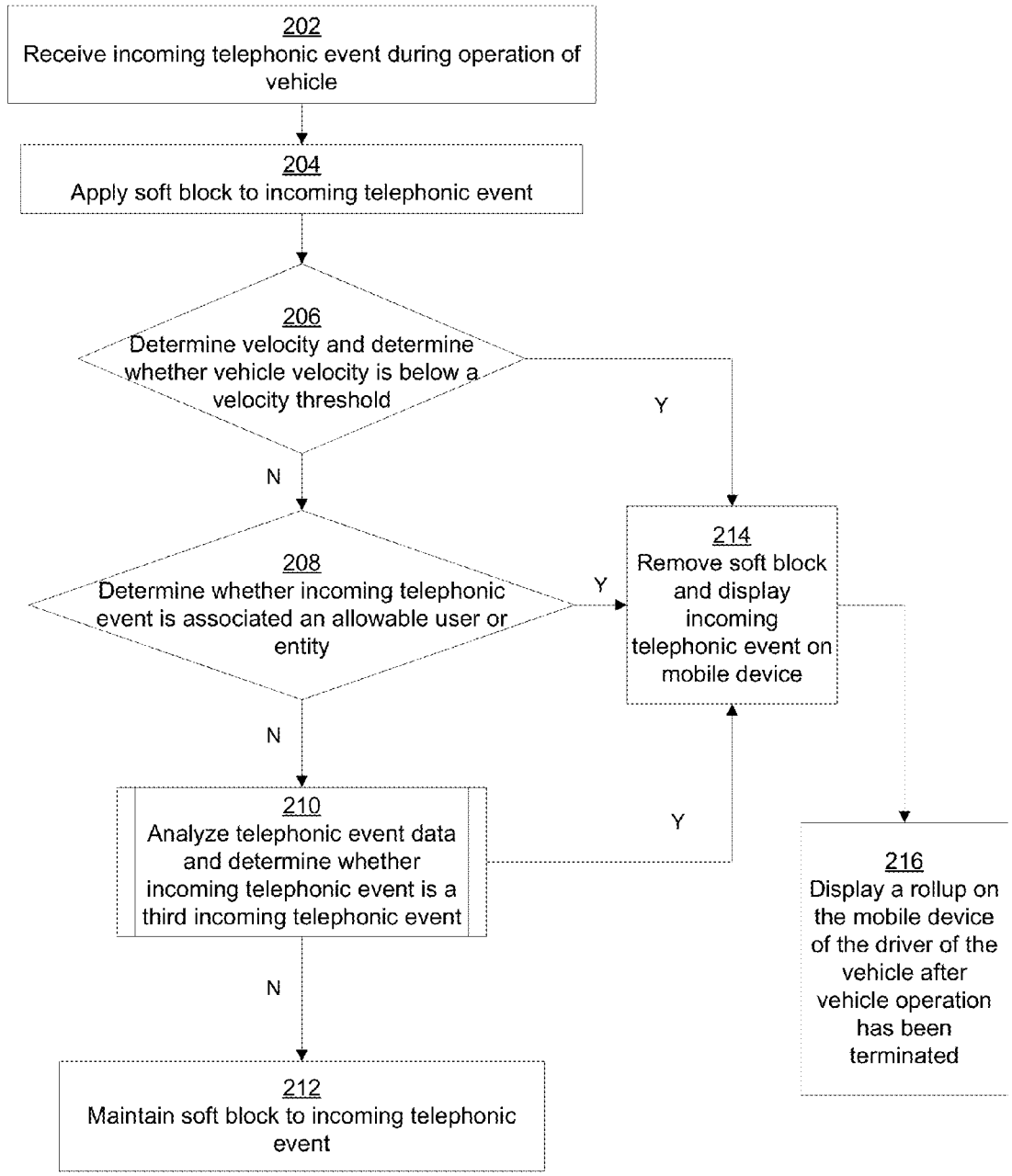
FIG. 2 is a flow diagram illustrating an example of an incoming telephonic event analysis method according to one or more aspects of the disclosure.

FIG. 2 depicts a flow diagram illustrating an example of an incoming telephonic event analysis method according to one or more aspects of the disclosure. As will be described below, the processes of the incoming telephonic event analysis method may be performed by any one, or combination of, mobile device 120, on-board computer 115, and incoming telephonic event analysis system 140.

At step 202, the mobile device 120 associated with a driver of vehicle 110 may receive an incoming telephonic event during the operation of vehicle 110. The incoming telephonic event may be of any of a plurality of telephonic event types (e.g., telephone call, text message, email, application notification, etc.) and may be associated with a first individual (e.g., mother, father, spouse, child, friend, coworker, etc.) associated with the driver of vehicle 110 or a first entity (e.g., bank, doctor's office, work place, telemarketer, etc.). In some instances, the incoming telephonic event may be a first, second, or third incoming telephonic event associated with the first individual or first entity. In instances in which the incoming telephonic event is a second or third incoming telephonic event, the incoming telephonic event may be of the same type, or a different type, as the previously received telephonic event(s). For example, if the incoming telephonic event is a second incoming telephonic event and is a telephone call, a previously received first incoming telephonic event may also be a telephone call, or may be any of a text message, email, application notification, and the like.

At step 204, upon receipt of the incoming telephonic event during an active operation state of the vehicle 110, an incoming telephonic event analysis application operating on mobile device 120 may apply a soft block to the incoming telephonic event preventing the event from being displayed on (and/or preventing audio notification from) the mobile device 120 based on the active operating state of the vehicle 110. The soft block applied by the incoming event analysis application may be a fluid block, which may be either removed or maintained depending on an analysis of the incoming telephonic event. After applying the soft block, the incoming telephonic event analysis application may analyze the incoming telephonic event in relation to a velocity of the vehicle 110, a pre-stored allowable individual or entity list, and/or an emergency incoming telephonic event threshold. In some instances, the analysis of the incoming telephonic event in relation to the above-mentioned factors may be performed by the incoming telephonic event analysis application of mobile device 120, on-board computer 115, and/or incoming telephonic event analysis system 140.

At step 206, the incoming telephonic event analysis application may first determine a velocity of the vehicle 110. In determining the velocity of the vehicle 110, the incoming telephonic event analysis application may determine the velocity of vehicle 110 by requesting velocity data of the vehicle 110 from any one, or combination of, vehicle sensors 111, GPS 112, telematics device 113, on-board computer 115, and/or incoming event analysis system 140. The velocity of the vehicle 110 may be a static value determined at the time of receipt of the telephonic event or may be a dynamic value determined throughout the duration of the telephonic event. In instances in which the velocity of the vehicle 110 is a static value, the incoming telephonic event analysis application may request the velocity data corresponding to the time of receipt of the telephonic event. Alternatively, in instances in which the velocity of the vehicle 110 is a dynamic value, the incoming telephonic event analysis application may request a continuous velocity data stream commencing at the time of receipt of the incoming telephonic event.

Through requesting the vehicle velocity data from a third party source (e.g., vehicle sensors 111, GPS 112, telematics device 113, on-board computer 115, and/or incoming event analysis system 140), incoming telephonic event analysis application may provide a technological solution to existing deficiencies associated with mobile applications that determine vehicle velocity based on GPS data provided by a GPS system associated with a mobile device and/or vehicle velocity determined based on accelerometer data provided by an accelerometer of the mobile device. As stated above, the velocity determinations provided by such applications are easily subverted through restricting GPS access for the mobile applications and/or through the utilization of vehicle cruise control systems (or travelling at a constant velocity) and thereby preventing mobile device accelerometer engagement. Therefore, by requesting vehicle velocity data from a third party source, occurrences of such issues may be reduced or eliminated.

In instances in which the velocity of the vehicle 110 is a static value, after receiving the requested static vehicle velocity data corresponding to the time of receipt of the incoming telephonic event, the incoming telephonic event analysis application may compare the received vehicle velocity data to a pre-stored and/or predetermined velocity threshold (e.g., 0 mph, 5 mph, 10 mph, etc.). If the received vehicle velocity data is less than the pre-stored velocity threshold, the incoming telephonic event analysis application may proceed to step 214 and remove the soft block and display the incoming telephonic event on the mobile device 120.

In one example, after removing the soft block and allowing the incoming telephonic event to be displayed on mobile device 120, the incoming telephonic event application may allow the user to take and/or respond to the telephonic event. In other examples, the incoming telephonic event application may allow the user to take and/or respond to the telephonic event for a predetermined period of time (e.g., 30 seconds, 1 minute, 2 minutes, etc.), allow the user to take and/or respond to the incoming telephonic event if it is of a specific telephonic event type (e.g., telephone call) for a predetermined period of time, or may allow the notification of the incoming telephonic event to be displayed on mobile device 120 but prevent the user from being able to take and/or respond to the event until after vehicle operation has concluded. When the incoming telephonic event is allowed to be taken and/or responded to by the user for a predetermined period of time, the incoming telephonic event analysis application may provide the user with incremental countdown updates alerting the user to the termination of the predetermined allowable period. Such updates may occur any number of times within the predetermined allowable period (e.g., two times within the allowable period, three times within the allowable period, etc.). Alternatively, if the received vehicle velocity data is greater than or equal to the pre-stored velocity threshold, the incoming telephonic event analysis application may maintain the soft block and proceed to step 208.

In instances in which the velocity of the vehicle 110 is a dynamic value, the incoming telephonic event analysis application may compare the first vehicle velocity data point from the velocity data stream corresponding to the time of receipt of the incoming telephonic event to a pre-stored and/or predetermined velocity threshold (e.g., 0 mph, 5 mph, 10 mph, etc.). If the first vehicle velocity data point is less than the pre-stored velocity threshold, the incoming telephonic event analysis application may proceed to step 214 and remove the soft block and display the incoming telephonic event on the mobile device 120.

After removing the soft block and allowing the incoming telephonic event to be displayed on mobile device 120, the incoming telephonic event application may allow the user to take and/or respond to the telephonic event, allow the user to take and/or respond to the telephonic event for a predetermined period of time (e.g., 30 seconds, 1 minute, 2 minutes, etc.), allow the user to take and/or respond to the incoming telephonic event if it is of a specific telephonic event type (e.g., telephone call) for a predetermined period of time, or allow the notification of the incoming telephonic event to be displayed on mobile device 120 but prevent the user from being able to take and/or respond to the event until after vehicle operation has concluded. However, the incoming telephonic event analysis application may continuously compare the vehicle velocity data points from the vehicle velocity data stream to the pre-stored and/or predetermined velocity threshold. In the event that a vehicle velocity data point from the vehicle velocity data stream exceeds the velocity threshold, the incoming telephonic event analysis application may alert the user that the incoming telephonic event will be terminated unless the user decreases the velocity of the vehicle to a point below the velocity threshold. Such an alert may be provided by the incoming telephonic event analysis application under any of the examples in which incoming telephonic event analysis application allows the user to take and/or respond to the incoming telephonic event. Alternatively, if the first vehicle velocity data point from the velocity data stream is greater than or equal to the pre-stored velocity threshold, the incoming telephonic event analysis application may maintain the soft block and proceed to step 208.

At step 208, if the received vehicle velocity data is greater than or equal to the pre-stored velocity threshold and the soft block is maintained, the incoming telephonic event analysis application may determine whether the incoming telephonic event is associated with an individual or entity pre-stored by the user through the incoming telephonic event analysis application as being an allowable individual or entity. The allowable individual or entity list may include one or more individuals or entities previously entered by the driver associated with mobile device 120 into the incoming telephonic event analysis application. The driver associated with mobile device 120 may be allowed to enter an unlimited or finite amount (e.g., five individuals or entities) of allowable individuals or entities into the allowable individual or entity list.

If the incoming telephonic event is determined to be associated with an allowable individual or entity, the incoming telephonic event analysis application may remove the soft block and allow the incoming telephonic event to be displayed on mobile device 120 regardless of the velocity of the vehicle. After removing the soft block and allowing the incoming telephonic event to be displayed on mobile device 120, the incoming telephonic event application may allow the user to take and/or respond to the telephonic event in the ways described above. Alternatively, if the incoming telephonic event is determined not to be associated with an allowable individual or entity, the incoming telephonic event analysis application may maintain the soft block and proceed to step 210.

At step 210, the incoming telephonic event analysis application may analyze telephonic event data corresponding to the incoming telephonic in comparison with previously received telephonic event data to determine whether the incoming telephonic event is a third telephonic event associated with a particular individual or entity. Such analyses are described in further detail in regard to FIGS. 3A and 3B.

Figure 3A:
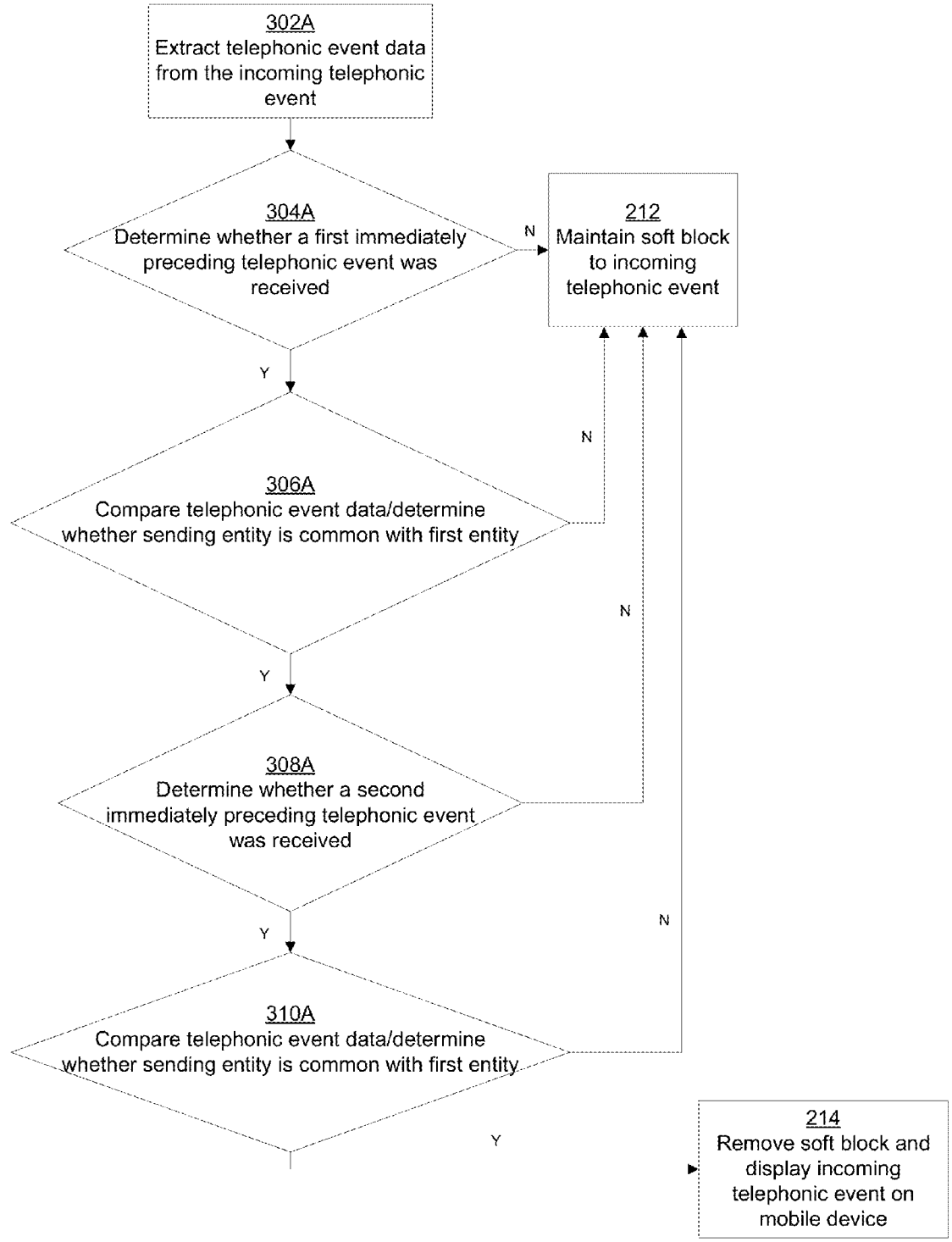
FIG. 3A is a flow diagram illustrating an example of an incoming telephonic event data analysis method according to one or more aspects of the disclosure.

FIG. 3A is a flow diagram illustrating an example of an incoming telephonic event data analysis method according to one or more aspects of the disclosure. At step 302A, the incoming telephonic event analysis application may extract telephonic event data from the incoming telephonic event. Such data may include a name, telephone number, user name (e.g., handle), event type (e.g., telephone call, text message, email, application notification, etc.), and time of receipt.

At step 304A, the incoming telephonic event analysis application may determine whether a first immediately preceding telephonic event was received. Data corresponding to previously received telephonic events may be previously stored in memory on mobile device 120 by the incoming telephonic event analysis application. In one instance, the stored previously received telephonic event data may correspond to an active operative period of vehicle 110, wherein the active operative is initiated by a positive ignition event (e.g., vehicle 110 is turned on). In such instances, mobile device 120 may be configured to receive indication of a positive ignition event from sensors 111, telematics device 113, and/or on-board computer 115 and the incoming telephonic event analysis application may be configured to create a data ledger within memory of mobile device 120 corresponding to the active operative period of vehicle 110. As will be discussed in further detail below, the data ledger may be cleared and/or reset responsive to the conclusion of the active operative period through receipt of an indication of a negative ignition event (e.g., vehicle 110 is turned off). In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

In any event, if no data corresponding to a first immediately preceding telephonic event exists in memory (e.g., no previous telephonic event data exists in memory), the incoming telephonic event analysis application may determine that the incoming telephonic event is a first incoming telephonic event. If the incoming telephonic event is determined to be a first incoming telephonic event, incoming telephonic event analysis application may maintain the soft block and prevent the first incoming telephonic event from being displayed on the mobile device 120 at step 212. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if one or more previously stored telephonic event data entries exists in memory in the data ledger, the determination of the first immediately preceding telephonic event may be made. In instances in which a plurality of previously stored telephonic event data entries exists in the data ledger, the determination of the first immediately preceding telephonic event may be made based on a time difference between the time of receipt of the incoming telephonic event and previously stored receipt times corresponding to previously received telephonic events. The difference with the smallest magnitude may be determined to be the first immediately preceding telephonic event. Alternatively, in instances in which data corresponding to only one previously received telephonic event is stored in memory in the data ledger, a comparison of receipt times may be foregone and the one previously received telephonic event may be determined to be the first immediately preceding telephonic event.

At step 306A, after determining that a first immediately preceding telephonic event was received, the incoming telephonic event analysis application may compare the extracted name, telephone number, and user name (e.g., handle) from the incoming telephonic event to that of the first immediately preceding telephonic event to determine whether or not the incoming telephonic event and the first immediately preceding telephonic event share a common sending individual or entity. If it is determined that the incoming telephonic event and the first immediately preceding telephonic event do not share a common sending individual or entity, the incoming telephonic event analysis application may determine that the incoming telephonic event is a first incoming telephonic event associated with a particular sending individual or entity. After such a determination, the incoming telephonic event analysis application may maintain the soft block and prevent the first incoming telephonic event from being displayed on the mobile device 120 at step 212. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if it is determined that the incoming telephonic event and the first immediately preceding telephonic event share a common sending individual or entity, the incoming telephonic event analysis application may determine that the incoming telephonic event is at least a second incoming telephonic event associated with the particular sending individual or entity and may proceed to step 308A.

At step 308A, the incoming telephonic event analysis application may determine whether a second immediately preceding telephonic event was received. In doing so, the incoming telephonic event analysis application may review the data ledger in memory to determine if a second immediately preceding telephonic event was received. If no data corresponding to a second immediately preceding telephonic event exists in memory (e.g., only data corresponding to the first immediately preceding telephonic event exits in memory), the incoming telephonic event analysis application may determine that the incoming telephonic event is a second incoming telephonic event associated with the particular individual or entity and prevent the second incoming telephonic event from being displayed on the mobile device 120 at step 212. Additionally, the incoming telephonic event analysis application may provide a notification to the individual or entity associated with the second incoming telephonic event alerting the individual or entity that the user is still driving and unavailable to respond to the telephonic event, but if that it is an emergency situation, the individual or entity should provide a third telephonic event to be connected to the mobile device of the user. Furthermore, the incoming telephonic event analysis application may store the telephonic event data associated with the second telephonic event in memory in the data ledger associated with the active operative period of vehicle 110.

Conversely, if two or more previously stored telephonic event data entries exists in memory in the data ledger, the determination of the second immediately preceding telephonic event may be made. In instances in which a plurality of previously stored telephonic event data entries exists in the data ledger, the determination of the second immediately preceding telephonic event may be made based on a time difference between the time of receipt of the incoming telephonic event and previously stored receipt times corresponding to previously received telephonic events. The difference with the second smallest magnitude may be determined to be the second immediately preceding telephonic event.

At step 310A, after determining that a second immediately preceding telephonic event was received, the incoming telephonic event analysis application may compare the extracted name, telephone number, and user name (e.g., handle) from the incoming telephonic event to that of the second immediately preceding telephonic event to determine whether or not the incoming telephonic event and the second immediately preceding telephonic event share a common sending individual or entity. If it is determined that the incoming telephonic event and the second immediately preceding telephonic event do not share a common sending individual or entity, the incoming telephonic event analysis application may determine that the incoming telephonic event is a second incoming telephonic event associated with the particular individual or entity and prevent the second incoming telephonic event from being displayed on the mobile device 120 at step 212. Additionally, the incoming telephonic event analysis application may provide a notification to the individual or entity associated with the second incoming telephonic event alerting the individual or entity that the user is still driving and unavailable to respond to the telephonic event, but if that it is an emergency situation, the individual or entity should provide a third telephonic event to be connected to the mobile device of the user. Furthermore, the incoming telephonic event analysis application may store the telephonic event data associated with the second telephonic event in memory in the data ledger associated with the active operative period of vehicle 110.

Conversely, if it is determined that the incoming telephonic event and the second immediately preceding telephonic event share a common sending individual or entity, the incoming telephonic event analysis application may determine that the incoming telephonic event is at least a third incoming telephonic event associated with the particular sending individual or entity and, at step 214, the incoming telephonic event analysis application may remove the soft block and allow the third incoming telephonic event to being displayed on the mobile device 120. After removing the soft block and allowing the incoming telephonic event to be displayed on mobile device 120, the incoming telephonic event application may allow the user to take and/or respond to the telephonic event in the ways described above.

Figure 3B:
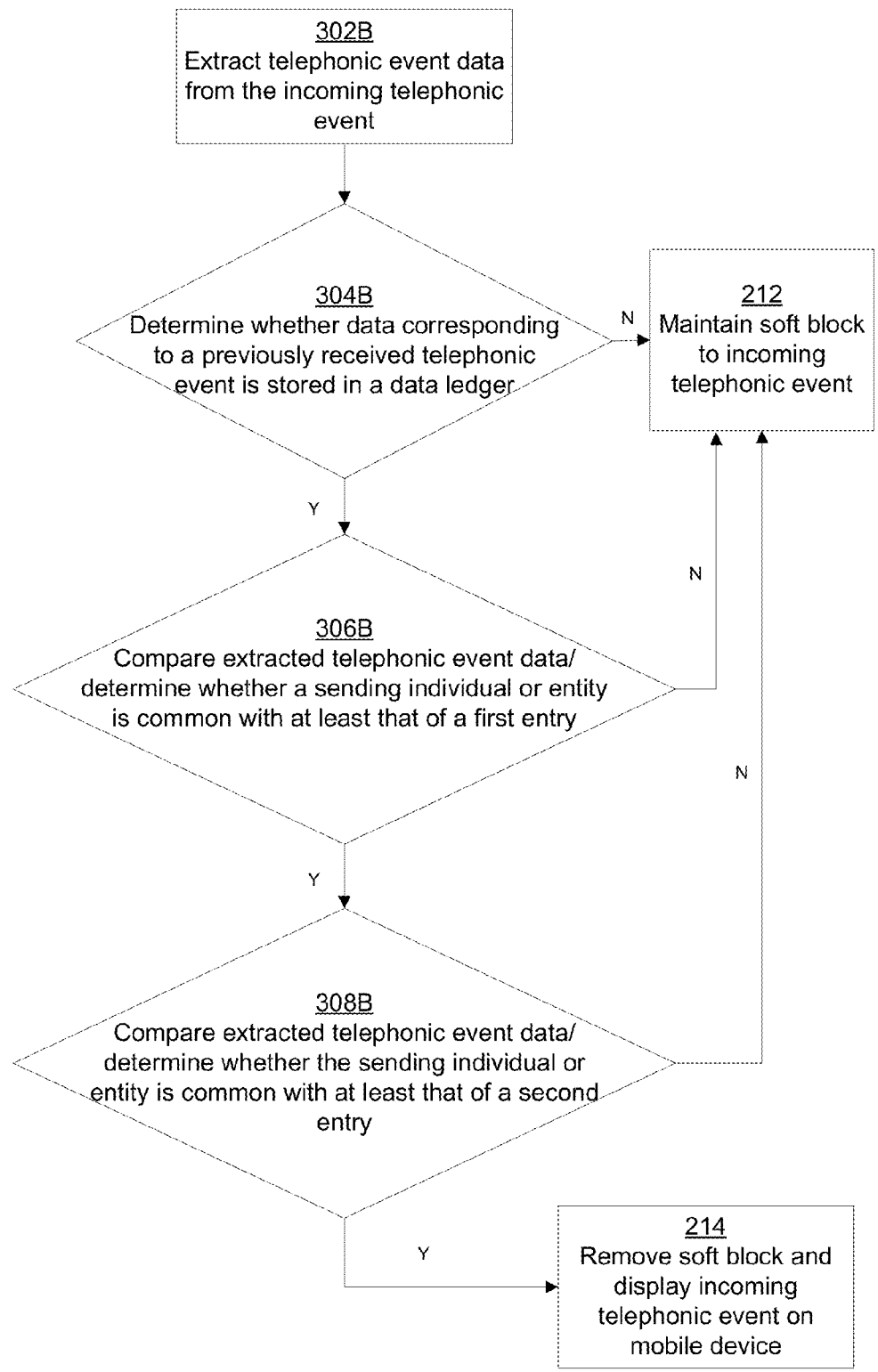
FIG. 3B is a flow diagram illustrating another example of an incoming telephonic event data analysis method according to one or more aspects of the disclosure.

FIG. 3B is a flow diagram illustrating another example of an incoming telephonic event data analysis method according to one or more aspects of the disclosure. At step 302B, the incoming telephonic event analysis application may extract telephonic event data from the incoming telephonic event. Such data may include a name, telephone number, user name (e.g., handle), event type (e.g., telephone call, text message, email, application notification, etc.), and time of receipt.

At step 304B, the incoming telephonic event analysis application may determine whether previously stored telephonic event data is stored in memory in the data ledger associated with the active operative period of vehicle 110. Data corresponding to previously received telephonic events may be previously stored in memory on mobile device 120 by the incoming telephonic event analysis application. In one instance, the stored previously received telephonic event data may correspond to an active operative period of vehicle 110, wherein the active operative is initiated by a positive ignition event (e.g., vehicle 110 is turned on). In such instances, mobile device 120 may be configured to receive indication of a positive ignition event from sensors 111, telematics device 113, and/or on-board computer 115 and the incoming telephonic event analysis application may be configured to create a data ledger within memory of mobile device 120 corresponding to the active operative period of vehicle 110. In one instance, the data ledger may be cleared and/or reset responsive to the conclusion of the active operative period through receipt of an indication of a negative ignition event (e.g., vehicle 110 is turned off). In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

However, in some cases, the active operating state of the vehicle 110 may be determined by a velocity, acceleration, and/or displacement magnitude and mobile device 120 may be configured to receive indication of such a magnitude from sensors 111, telematics device 113, and/or on-board computer 115 and the incoming telephonic event analysis application may be configured to create a data ledger within memory of mobile device 120 corresponding to the active operative period of vehicle 110. Similarly, the termination of an active operating state of the vehicle 110 may be determined by a prolonged period (e.g., 1 min, 5 min, 10 min, etc.) without a velocity, acceleration, and/or displacement magnitude.

In some instances, the start of an active operating state of the vehicle 110 may be determined by a negative parking brake indication (e.g., parking brake disengaged), a shift into reverse or drive after a prolonged period (e.g., 5 min, 10 min, 30 min, etc.) of being in park, a positive headlight activation, brake pedal activation, gas pedal activation, and/or a state change in one or more vehicle systems requiring user input.

Conversely, the end of an active operating state of vehicle 110 may be determined by a positive parking brake indication (e.g., parking brake engagement), a shift into park, headlight deactivation, absence of brake pedal usage, gas pedal usage, and/or state change in one or more vehicle systems requiring user input. Additionally, such state changes may be time constrained. Similar to the state changes noted above, mobile device 120 may be configured to receive indication of such state changes from sensors 111, telematics device 113, and/or on-board computer 115.

If no data corresponding to a previously received telephonic event exists in memory, the incoming telephonic event analysis application may determine that the incoming telephonic event is a first incoming telephonic event. If the incoming telephonic event is determined to be a first incoming telephonic event, incoming telephonic event analysis application may maintain the soft block and prevent the first incoming telephonic event from being displayed on the mobile device 120 at step 212. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if data corresponding to one or more previously received telephonic events is stored in memory in the data ledger associated with the active operative period of vehicle 110, the incoming telephonic event analysis application may consolidate the previously stored telephonic event data based on a retroactive time window, wherein the previously stored telephonic event data comprised within the consolidated window may be marked for further comparison with the telephonic event data of the incoming telephonic event. The retroactive time window may be a predetermined period of time (e.g., 1 minute, 5 minutes, 30 minutes, etc.) extending into the past from the time at which the incoming telephonic event was received at mobile device 120. For example, if previously stored telephonic event data exists in memory in the data ledger and an incoming telephonic event is received at 3:00 PM EST, the retroactive time window may extend into the past until 2:55 PM EST. Each telephonic event received between 2:55 PM EST and 3:00 PM EST may be isolated by the incoming telephonic event analysis application from the remainder of the previously stored telephonic event data received outside of the retroactive time window and marked for further comparison.

At step 306B, after isolating previously stored telephonic event data within the retroactive time window, the incoming telephonic event analysis application may compare the extracted name, telephone number, and user name (e.g., handle) from the incoming telephonic event to that of each of the previously stored telephonic event data entries in the consolidated time window to determine whether or not the incoming telephonic event and any of the previously stored telephonic event data entries share a common sending individual or entity. If it is determined that the incoming telephonic event and any of the previously stored telephonic event data entries do not share a common sending individual or entity, the incoming telephonic event analysis application may determine that the incoming telephonic event is a first incoming telephonic event associated with a particular sending individual or entity. After such a determination, the incoming telephonic event analysis application may maintain the soft block and prevent the first incoming telephonic event from being displayed on the mobile device 120 at step 212. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if it is determined that the incoming telephonic event and at least a first entry of the previously stored telephonic event data entries in the retroactive window share a common sending individual or entity, the incoming telephonic event analysis application may determine that the incoming telephonic event is at least a second incoming telephonic event associated with the particular individual or entity and may proceed to step 308B.

At step 308B, the incoming telephonic event analysis application may compare the extracted name, telephone number, and user name (e.g., handle) from the incoming telephonic event to that of each of the previously stored telephonic event data entries in the consolidated time window (besides the first entry sharing the common individual or entity determined in step 306B) to determine whether or not the incoming telephonic event and a second entry of the previously stored telephonic event data entries share a common sending individual or entity. If it is determined that the incoming telephonic event and none of the remainder of the previously stored telephonic event data entries share a common sending individual or entity, the incoming telephonic event analysis application may determine that the incoming telephonic event is a second incoming telephonic event associated with a particular sending individual or entity. After such a determination, the incoming telephonic event analysis application may maintain the soft block and prevent the second incoming telephonic event from being displayed on the mobile device 120 at step 212. Additionally, the incoming telephonic event analysis application may provide a notification to the individual or entity associated with the second incoming telephonic event that the user is driving and currently unavailable to respond to the telephonic event. Furthermore, the incoming telephonic event analysis application may store the telephonic event data associated with the second telephonic event in memory in the data ledger associated with the active operative period of vehicle 110.

Conversely, if it is determined that the incoming telephonic event and at least a second entry of the previously stored telephonic event data entries in the retroactive window share a common sending individual or entity, the incoming telephonic event analysis application may determine that the incoming telephonic event is at least a third incoming telephonic event associated with the particular sending individual or entity and, at step 214, the incoming telephonic event analysis application may remove the soft block and allow the third incoming telephonic event to being displayed on the mobile device 120. After removing the soft block and allowing the incoming telephonic event to be displayed on mobile device 120, the incoming telephonic event application may allow the user to take and/or respond to the telephonic event in the ways described above.

In some instances, when the soft block is removed by the incoming telephonic event analysis application and the incoming telephonic event is displayed on mobile device 120, the driver associated with mobile device 120 may be awarded points for not interacting with the mobile device 120 in response to the displayed telephonic event. Such points may be used by the driver associated with mobile device 120 to incrementally increase the predetermined vehicle velocity threshold and/or add additional individuals or entities to the allowable individual or entity list. For example, for every incoming telephonic event displayed on mobile device 120 that is not interacted with by the driver of vehicle 110, one point may be awarded to the driver. After 100 points have been awarded, the driver may be able to increase the velocity threshold by 0.1 mph. Alternatively, after 1000 points have been awarded, the driver may be able to add an additional individual or entity to the allowable individual or entity list. In some instances, the driver may receive electronic badges after surpassing certain point thresholds (e.g., 100 points, 500 points, etc.). Additionally or alternatively, the driver may receive a financial reward for reaching certain points thresholds.

At step 216, after the active operative period of vehicle 110 has been terminated and an indication of such has been received at mobile device 120, the incoming telephonic event analysis application may display a rollup on the mobile device 120 of the driver comprising each of the incoming telephonic events blocked from being displayed on mobile device 120 during driving. The rollup may include each of the data entries stored in the data ledger in memory. As such, each of the telephonic events received during operation of vehicle 110, the type of each of the telephonic events, the individual or entity associated with the each of the telephonic events, an indication of availability of each of the individuals or entities associated with each of the telephonic events, and the time of receipt of each of the telephonic events. In some instances, the driver may be able to select each of the telephonic events comprised in the rollup to respond to the telephonic event in the manner corresponding to the event type (e.g., telephone call, email, text message, application specific interface, etc.). Alternatively, the driver may be able to select from the totality of telephonic event types in responding to the received telephonic event.

In some instances, the incoming telephonic event analysis application may be configured to cleared and/or reset the data ledger responsive to the conclusion of the active operative period through receipt of a state change event from sensors 111, telematics device 113, and/or on-board computer 115. In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

In examples in which the analysis of the incoming telephonic event is performed by on-board computer 115 and/or incoming telephonic event analysis system 140, mobile device 120 may transmit incoming telephonic event data to on-board computer 115 and/or incoming telephonic event analysis system 140. Such data may include the individual or entity associated with incoming telephonic event, time of receipt of the incoming telephonic event, and the type of the incoming telephonic event. Upon receipt of the incoming telephonic event data, on-board computer 115 and incoming telephonic event analysis system 140, alone or in combination, may be able to perform the determination features outlined above in steps 206, 208, and 210 (e.g., FIGS. 3A and 3B). Responsive to performing the respective determination steps, on-board computer 115 and incoming telephonic event analysis system 140, either alone or in combination, may be configured to transmit the results of such steps to mobile device 120.

Figure 4:
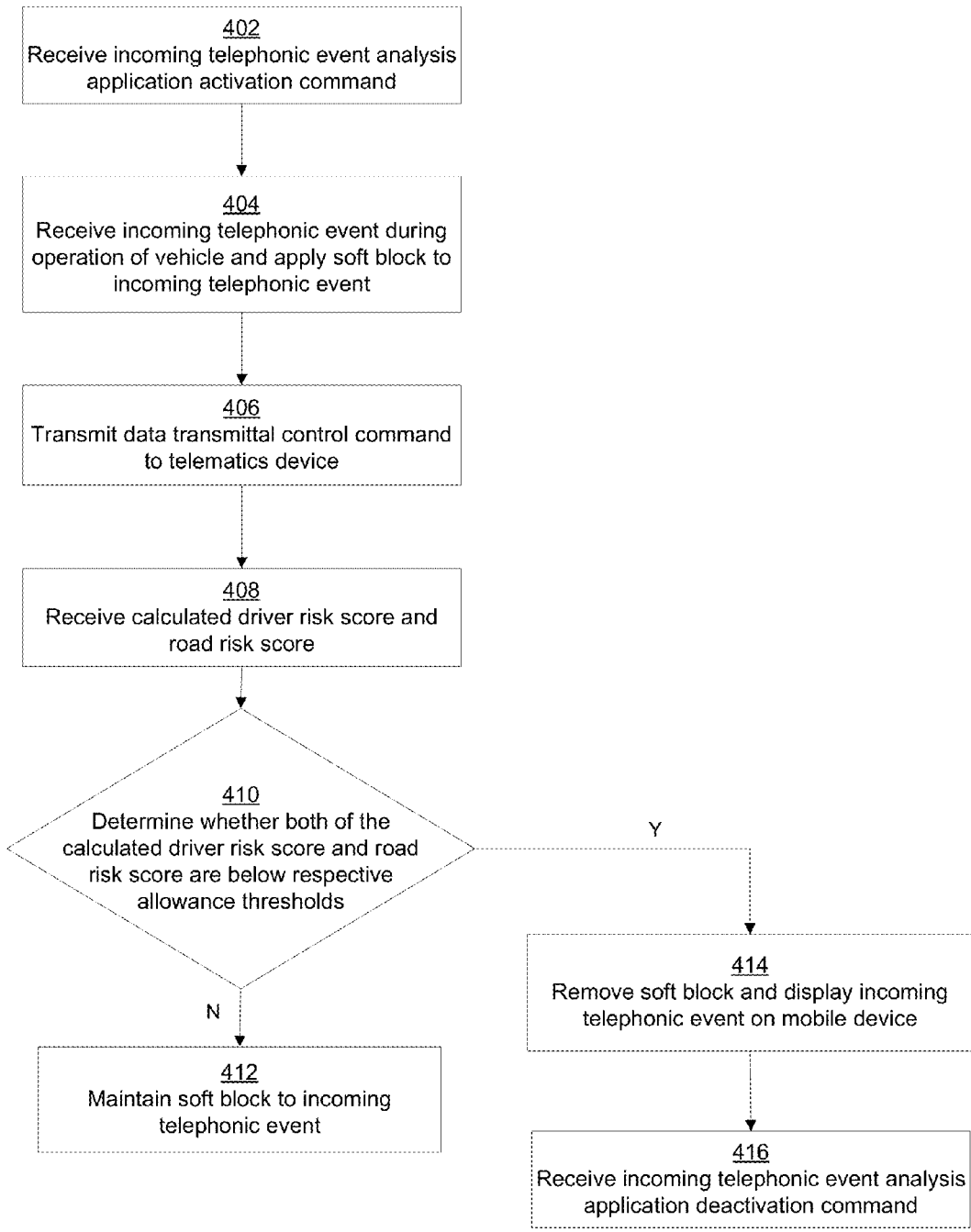
FIG. 4 is a flow diagram illustrating another example of an incoming telephonic event analysis method according to one or more aspects of the disclosure.

FIG. 4 is a flow diagram illustrating another example of an incoming telephonic event analysis method according to one or more aspects of the disclosure. As will be described below, the processes of the incoming telephonic event analysis method may be performed by any one, or combination of, mobile device 120, on-board computer 115, and incoming telephonic event analysis system 140.

At step 402, the mobile device 120 may receive an incoming telephonic event analysis application activation command from on-board computer 115, which may send the activation command in response to receiving a positive vehicle ignition event (e.g., turning vehicle on and commencing active vehicle operation state) and/or any one, or combination of, state change events described above. Responsive to receiving the incoming telephonic event analysis application activation command, mobile device 120 may activate the incoming telephonic event analysis application. As such, the processing of mobile device 120 may be controlled at least in part by the on-board computer 115 in cases in which an ignition event is detected. In doing so, the battery of mobile device 120 may be conserved by preventing the processes of the incoming telephonic event analysis application from running in a state outside of the operation of vehicle 110. Additionally, by automating the application activation based on an ignition event, instances in which the driver of vehicle 110 associated with mobile device 120 forgets to launch the incoming telephonic event analysis application may be reduced or eliminated.

At step 404, after the incoming telephonic event analysis application has been activated on mobile device 120 responsive to the command sent from vehicle on-board computer 115, the mobile device 120 associated with the driver of vehicle 110 may receive an incoming telephonic event during operation of vehicle 110. The incoming telephonic event may be of any of a plurality of telephonic event types. Upon receipt of the incoming telephonic event, the incoming telephonic event analysis application operating on mobile device 120 may apply a soft block to the incoming telephonic event preventing the event from being displayed on the mobile device 120 based on the active operation state of the vehicle 110.

At step 406, the mobile device 120 may transmit a data transmittal control command to telematics device 113. The data transmittal control command may be configured to activate telematics device 113 and may further include instructions for the telematics device 113 to transmit specific data elements of the vehicle operational data and environmental conditions data to incoming telephonic event analysis system 140 corresponding to the time of receipt of the incoming telephonic event. The specific data elements within the broader categories of vehicle operational data and environmental conditions data may coincide with data elements required by driver score/risk map server 170 to perform the calculations of the driver risk score and road risk score. Alternatively, the data transmittal control command may include instructions for telematics device 113 to transmit the specific data elements to mobile device 120. In such instances, the incoming telephonic event analysis application on mobile device 120 may be configured to perform the driver risk score and road risk score calculations described below in regards to driver score/risk map server 170. In either event, by transmitting only the necessary data to perform the driver risk score and road risk score calculations corresponding to the time of receipt of the incoming telephonic event, bandwidth and processing power may be conserved.

In response to receiving the specific data elements of the vehicle operational data and environmental conditions data from telematics device 113, incoming telephonic event analysis system 140 may route the data to driver score/risk map server 170. The driver score/risk map server 170 may use the data in conjunction with historical data stored in driver score/risk map database 174 and auxiliary environmental conditions data provided by third party data source server 160 to perform the driver risk score and road risk score calculations. After performing the calculations, driver score/risk map server 170 may transmit the calculated driver risk score and road risk score to mobile device 120, which may be configured to receive the calculated driver risk score and road risk score at step 308.

At step 410, upon receiving the calculated driver risk score and road risk score from driver score/risk map server 170, the incoming telephonic event analysis application on mobile device 120 may determine whether or not to remove or to maintain the soft block applied to the incoming telephonic event. In doing so, the incoming telephonic event analysis application may compare both the driver risk score and the road risk score to allowance thresholds respective to the driver risk score and the road risk score. If both of the driver score and the road risk score are below the respective allowance thresholds, the incoming telephonic event analysis application may proceed to step 314, remove the soft block, and allow the incoming telephonic event to the displayed on the mobile device 120. After removing the soft block and allowing the incoming telephonic event to be displayed on mobile device 120, the incoming telephonic event application may allow the user to take and/or respond to the telephonic event in the ways described above. Alternatively, if either or both of the driver risk score or the road risk score is above the respective allowance threshold, the incoming telephonic event analysis application may proceed to step 312, maintain the soft block, and prevent the incoming telephonic event from being displayed on the mobile device 120.

In some instances, when the soft block is removed by the incoming telephonic event analysis application and the incoming telephonic event is displayed on mobile device 120, the driver associated with mobile device 120 may be awarded points for not interacting with the mobile device 120 in response to the displayed telephonic event. Such points may be used by the driver associated with mobile device 120 to incrementally increase the predetermined vehicle velocity threshold and/or add additional individuals or entities to the allowable individual or entity list. For example, for every incoming telephonic event displayed on mobile device 120 that is not interacted with by the driver of vehicle 110, one point may be awarded to the driver. After 100 points have been awarded, the driver may be able to increase the velocity threshold by 0.1 mph. Alternatively, after 1000 points have been awarded, the driver may be able to add an additional individual or entity to the allowable individual or entity list. In some instances, the driver may receive electronic badges after surpassing certain point thresholds (e.g., 100 points, 500 points, etc.).

At step 416, after driving has been completed and vehicle 110 is turned off, the mobile device 120 may receive an incoming telephonic event analysis application deactivation command from on-board computer 115, which may be send the deactivation command in response to receiving a negative vehicle ignition event (e.g., turning vehicle off). By activating and deactivating the incoming telephonic event analysis application in response to a vehicle ignition event (e.g., turning vehicle on or off), the battery and processing power of mobile device 120 may be conserved by ensuring that the utilization of the incoming telephonic event analysis application coincides with periods of operation of vehicle 110. Additionally, the usage of the vehicle ignition event to trigger the incoming telephonic event analysis application may restrict the operation of the application to periods of driving and prevent operation carry over between periods of driving and periods of non-driving.

After operation of vehicle 110 has been terminated but prior to deactivation, the incoming telephonic event analysis application may provide the driver associated with mobile device 110 with a rollup comprising each of the incoming telephonic events blocked from being displayed on mobile device 120 during driving. The rollup may include each of the telephonic events received during operation of vehicle 110, the type of each of the telephonic events, the individual or entity associated with the each of the telephonic events, an indication of availability of each of the individuals or entities associated with each of the telephonic events, and the time of receipt of each of the telephonic events. In some instances, the driver may be able to select each of the telephonic events comprised in the rollup to respond to the telephonic event in the manner corresponding to the event type (e.g., telephone call, email, text message, application specific interface, etc.). Alternatively, the driver may be able to select from the totality of telephonic event types in responding to the received telephonic event.

Figure 5:
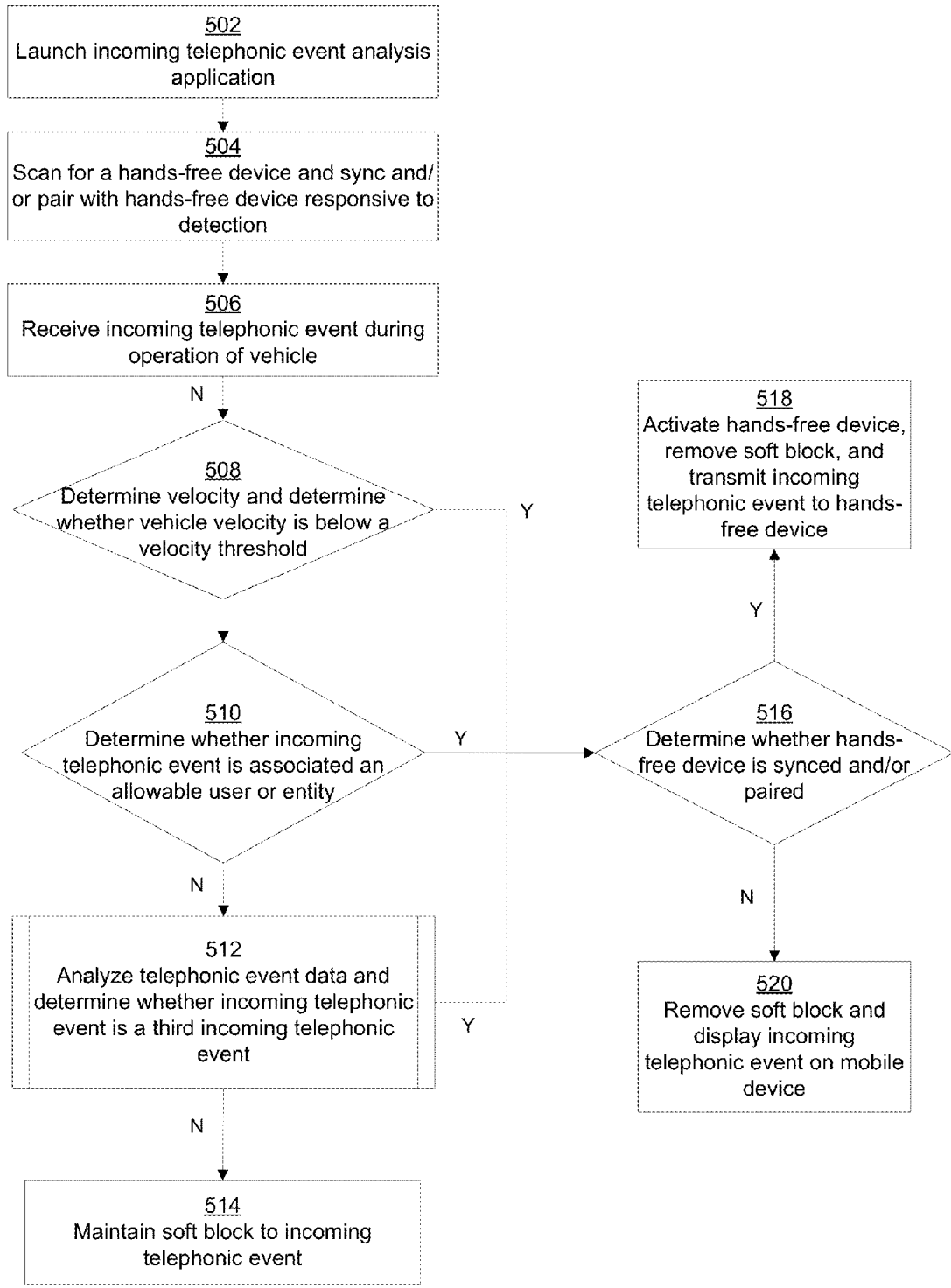
FIG. 5 is a flow diagram illustrating an example of an incoming telephonic event analysis method based on the presence of a hands-free device according to one or more aspects of the disclosure.

FIG. 5 is a flow diagram illustrating an example of an incoming telephonic event analysis method based on the presence of a hands-free device according to one or more aspects of the disclosure. As will be described below, the processes of the incoming telephonic event analysis method may be performed by any one, or combination of, mobile device 120, on-board computer 115, and incoming telephonic event analysis system 140.

At step 502, mobile device 120 may launch the incoming telephonic event analysis application in response to a user input. At step 504, after the incoming telephonic event analysis application has been launched, the incoming telephonic event analysis application may cause the mobile device 120 to scan for the presence of a hands-free device 116 in the proximity of mobile device 120. In the event that a hands-free device 116 is registered during the scan conducted by mobile device 120, the incoming telephonic event analysis application may instruct the mobile device 120 to sync and/or pair with the hands-free device 116. Alternatively, if a hands-free device 116 is not registered during the scan, no instruction to sync and/or pair may be given to mobile device 120.

In either event, at step 506, mobile device 120 associated with a driver of vehicle 110 may receive an incoming telephonic event during operation of vehicle 110. The incoming telephonic event may be of any of a plurality of telephonic event types and may be associated with a first individual associated with the driver of vehicle 110 or a first entity. In some instances, the incoming telephonic event may be a first, second, or third incoming telephonic event associated with the first individual or first entity. Upon receipt of the incoming telephonic event, the incoming telephonic event analysis application operating on mobile device 120 may apply a soft block to the incoming telephonic event preventing the event from being displayed on the mobile device 120 based on the active operative state of the vehicle 110. After applying the soft block, the incoming event analysis application may analyze the incoming telephonic event in relation to a state of syncing and/or pairing with the hands-free device 116, a velocity of the vehicle 110 corresponding to the time of receipt of the telephonic event, a pre-stored allowable individual or entity list, and/or an emergency incoming telephonic event threshold.

At step 508, the incoming telephonic event analysis application may determine a velocity of the vehicle 110 at the time of receiving the incoming telephonic event. In determining the velocity of the vehicle 110, the incoming telephonic event analysis application may request velocity data of the vehicle 110 from any one, or combination of, vehicle sensors 111, GPS 112, telematics device 113, on-board computer 115, and/or incoming event analysis system 140. The velocity of the vehicle 110 may be a static value determined at the time of receipt of the telephonic event or may be a dynamic value determined throughout the duration of the telephonic event. In instances in which the velocity of the vehicle 110 is a static value, the incoming telephonic event analysis application may request the velocity data corresponding to the time of receipt of the telephonic event. Alternatively, in instances in which the velocity of the vehicle 110 is a dynamic value, the incoming telephonic event analysis application may request a continuous velocity data stream commencing at the time of receipt of the incoming telephonic event.

In instances in which the velocity of the vehicle 110 is a static value, after receiving the requested static vehicle velocity data corresponding to the time of receipt of the incoming telephonic event, the incoming telephonic event analysis application may compare the received vehicle velocity data to a pre-stored and/or predetermined velocity threshold (e.g., 0 mph, 5 mph, 10 mph, etc.). At step 516, if the received vehicle velocity data is less than the pre-stored velocity threshold, the incoming telephonic event analysis application may determine whether or not the mobile device 120 was synced and/or paired with the hands-free device 116. At step 518, if the mobile device 120 was previously synced and/or paired with the hands-free device 116 after the launching of the incoming telephonic event analysis application, the incoming telephonic event analysis application may activate the hands-free device 116, remove the soft block, and direct the incoming telephonic event on the mobile device 120 to hands-free device 116. Alternatively, at step 520, if the mobile device 120 was not previously synced and/or paired with the hands-free device 116 because no hands-free device 116 was detected after launch of the incoming telephonic event analysis application, the incoming telephonic event analysis application may remove the soft block and display the incoming telephonic event on the mobile device 120.

In one example, after step 518 or step 520, the incoming telephonic event application may allow the user to take and/or respond to the telephonic event, allow the user to take and/or respond to the telephonic event for a predetermined period of time (e.g., 30 seconds, 1 minute, 2 minutes, etc.), allow the user to take and/or respond to the incoming telephonic event if it is of a specific telephonic event type (e.g., telephone call) for a predetermined period of time, or may allow the notification of the incoming telephonic event to be displayed on mobile device 120 but prevent the user from being able to take and/or respond to the event until after vehicle operation has concluded. When the incoming telephonic event is allowed to be taken and/or responded to by the user for a predetermined period of time, the incoming telephonic event analysis application may provide the user with incremental countdown updates alerting the user to the termination of the predetermined allowable period. Such updates may occur any number of times within the predetermined allowable period (e.g., two times within the allowable period, three times within the allowable period, etc.). Alternatively, if the received vehicle velocity data is greater than or equal to the pre-stored velocity threshold, the incoming telephonic event analysis application may maintain the soft block and proceed to step 510.

In instances in which the velocity of the vehicle 110 is a dynamic value, the incoming telephonic event analysis application may compare the first vehicle velocity data point from the velocity data stream corresponding to the time of receipt of the incoming telephonic event to a pre-stored and/or predetermined velocity threshold (e.g., 0 mph, 5 mph, 10 mph, etc.). At step 516, if the first vehicle velocity data point is less than the pre-stored velocity threshold, the incoming telephonic event analysis application may determine whether or not the mobile device 120 was synced and/or paired with the hands-free device 116. At step 518, if the mobile device 120 was previously synced and/or paired with the hands-free device 116 after the launching of the incoming telephonic event analysis application, the incoming telephonic event analysis application may activate the hands-free device 116, remove the soft block, and direct the incoming telephonic event on the mobile device 120 to hands-free device 116. Alternatively, at step 520, if the mobile device 120 was not previously synced and/or paired with the hands-free device 116 because no hands-free device 116 was detected after launch of the incoming telephonic event analysis application, the incoming telephonic event analysis application may remove the soft block and display the incoming telephonic event on the mobile device 120.

After step 518 or step 520, the incoming telephonic event application may allow the user to take and/or respond to the telephonic event, allow the user to take and/or respond to the telephonic event for a predetermined period of time (e.g., 30 seconds, 1 minute, 2 minutes, etc.), allow the user to take and/or respond to the incoming telephonic event if it is of a specific telephonic event type (e.g., telephone call) for a predetermined period of time, or allow the notification of the incoming telephonic event to be displayed on mobile device 120 but prevent the user from being able to take and/or respond to the event until after vehicle operation has concluded. However, the incoming telephonic event analysis application may continuously compare the vehicle velocity data points from the vehicle velocity data stream to the pre-stored and/or predetermined velocity threshold. In the event that a vehicle velocity data point from the vehicle velocity data stream exceeds the velocity threshold, the incoming telephonic event analysis application may alert the user that the incoming telephonic event will be terminated unless the user decreases the velocity of the vehicle to a point below the velocity threshold. Such an alert may be provided by the incoming telephonic event analysis application under any of the examples in which incoming telephonic event analysis application allows the user to take and/or respond to the incoming telephonic event. Alternatively, if the first vehicle velocity data point from the velocity data stream is greater than or equal to the pre-stored velocity threshold, the incoming telephonic event analysis application may maintain the soft block and proceed to Step 410.

At step 510, if the received vehicle velocity data is greater than or equal to the pre-stored velocity threshold and the soft block is maintained, the incoming event analysis application may determine whether the incoming telephonic event is associated with an individual or entity pre-stored by the user through the incoming event analysis application as being an allowable individual or entity. The allowable individual or entity list may include one or more individuals or entities previously entered by the driver associated with mobile device 120 into the incoming telephonic event analysis application. The driver associated with mobile device 120 may be allowed to enter an unlimited or finite amount (e.g., five individuals or entities) of allowable individuals or entities into the allowable individual or entity list.

At step 516, if the incoming telephonic event is determined to be associated with an allowable individual or entity, the incoming telephonic event analysis application may determine whether or not the mobile device 120 was synced and/or paired with the hands-free device 116. At step 518, if the mobile device 120 was previously synced and/or paired with the hands-free device 116, the incoming telephonic event analysis application may activate the hands-free device 116, remove the soft block, and direct the incoming telephonic event on the mobile device 120 to hands-free device 116. Alternatively, at step 520, if the mobile device 120 was not previously synced and/or paired with the hands-free device 116, the incoming telephonic event analysis application may remove the soft block and display the incoming telephonic event on the mobile device 120. Conversely, if the incoming telephonic event is determined not to be associated with an allowable individual or entity, the incoming telephonic event analysis application may maintain the soft block and prevent the incoming telephonic event from being displayed on mobile device 120 regardless of whether or not the mobile device 120 was synced and/or paired with hands-free device 116 and proceed to step 512.

At step 512, the incoming telephonic event analysis application may analyze telephonic event data corresponding to the incoming telephonic in comparison with previously received telephonic event data to determine whether the incoming telephonic event is a third telephonic event associated with a particular individual or entity. Such analyses are described in further detail in regard to FIGS. 6A and 6B.

Figure 6A:
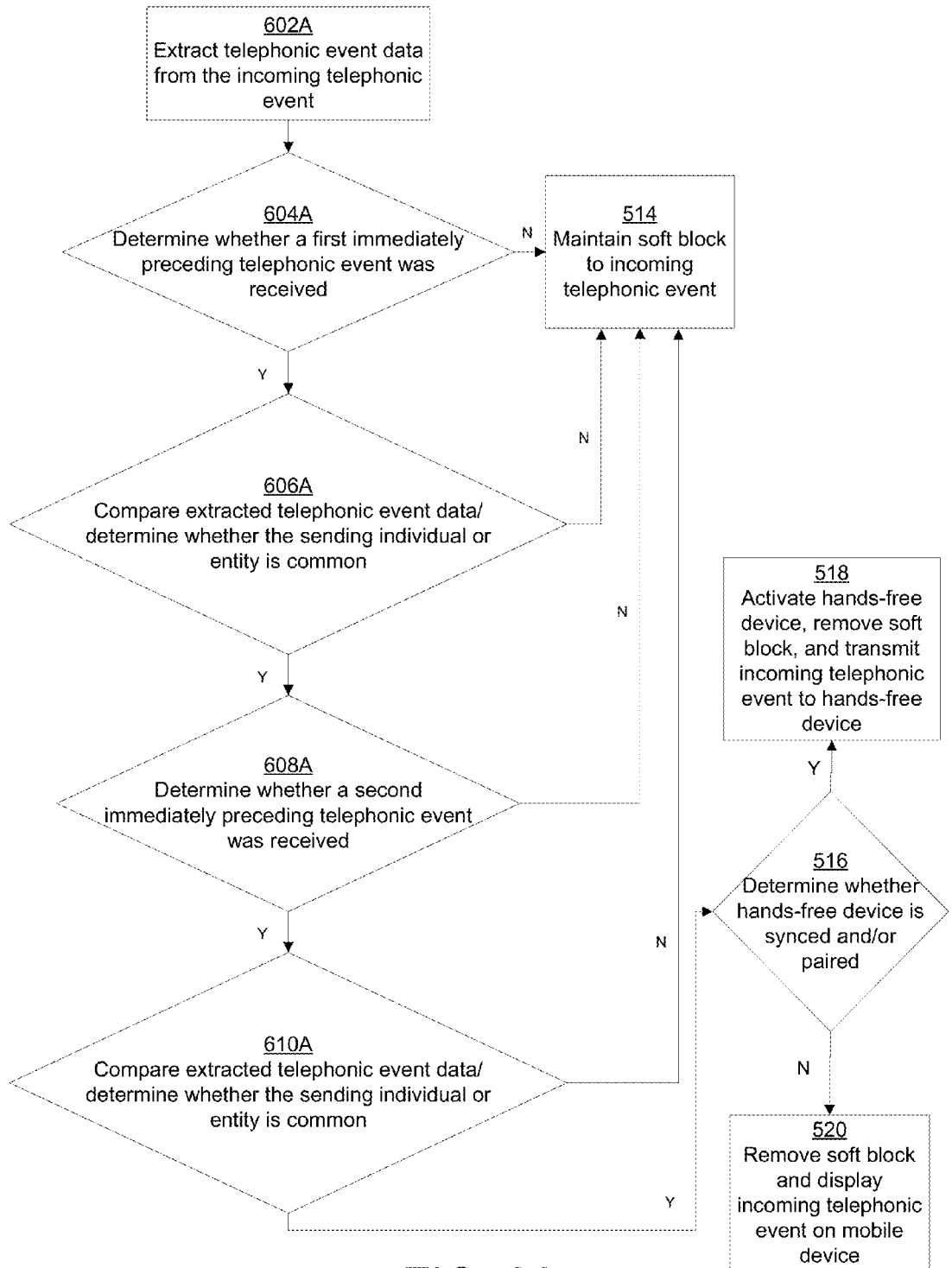
FIG. 6A is a flow diagram illustrating an example of an incoming telephonic event data analysis method according to one or more aspects of the disclosure.

FIG. 6A is a flow diagram illustrating an example of an incoming telephonic event data analysis method according to one or more aspects of the disclosure. At step 602A, the incoming telephonic event analysis application may extract telephonic event data from the incoming telephonic event. Such data may include a name, telephone number, user name (e.g., handle), event type (e.g., telephone call, text message, email, application notification, etc.), and time of receipt.

At step 604A, the incoming telephonic event analysis application may determine whether a first immediately preceding telephonic event was received. Data corresponding to previously received telephonic events may be previously stored in memory on mobile device 120 by the incoming telephonic event analysis application. In one instance, the stored previously received telephonic event data may correspond to an active operative period of vehicle 110, wherein the active operative is initiated by a positive ignition event (e.g., vehicle 110 is turned on). In such instances, mobile device 120 may be configured to receive indication of a positive ignition event from sensors 111, telematics device 113, and/or on-board computer 115 and the incoming telephonic event analysis application may be configured to create a data ledger within memory of mobile device 120 corresponding to the active operative period of vehicle 110. As will be discussed in further detail below, the data ledger may be cleared and/or reset responsive to the conclusion of the active operative period through receipt of an indication of a negative ignition event (e.g., vehicle 110 is turned off). In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

In any event, if no data corresponding to a first immediately preceding telephonic event exists in memory (e.g., no previous telephonic event data exists in memory), the incoming telephonic event analysis application may determine that the incoming telephonic event is a first incoming telephonic event. If the incoming telephonic event is determined to be a first incoming telephonic event, incoming telephonic event analysis application may maintain the soft block and prevent the first incoming telephonic event from being displayed on the mobile device 120 at step 514. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if one or more previously stored telephonic event data entries exists in memory in the data ledger, the determination of the first immediately preceding telephonic event may be made. In instances in which a plurality of previously stored telephonic event data entries exists in the data ledger, the determination of the first immediately preceding telephonic event may be made based on a time difference between the time of receipt of the incoming telephonic event and previously stored receipt times corresponding to previously received telephonic events. The difference with the smallest magnitude may be determined to be the first immediately preceding telephonic event. Alternatively, in instances in which data corresponding to only one previously received telephonic event is stored in memory in the data ledger, a comparison of receipt times may be foregone and the one previously received telephonic event may be determined to be the first immediately preceding telephonic event.

At step 606A, after determining that a first immediately preceding telephonic event was received, the incoming telephonic event analysis application may compare the extracted name, telephone number, and user name (e.g., handle) from the incoming telephonic event to that of the first immediately preceding telephonic event to determine whether or not the incoming telephonic event and the first immediately preceding telephonic event share a common sending individual or entity. If it is determined that the incoming telephonic event and the first immediately preceding telephonic event do not share a common sending individual or entity, the incoming telephonic event analysis application may determine that the incoming telephonic event is a first incoming telephonic event associated with a particular sending individual or entity. After such a determination, the incoming telephonic event analysis application may maintain the soft block and prevent the first incoming telephonic event from being displayed on the mobile device 120 at step 514. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if it is determined that the incoming telephonic event and the first immediately preceding telephonic event share a common sending individual or entity, the incoming telephonic event analysis application may determine that the incoming telephonic event is at least a second incoming telephonic event associated with the particular sending individual or entity and may proceed to step 608A.

At step 608A, the incoming telephonic event analysis application may determine whether a second immediately preceding telephonic event was received. In doing so, the incoming telephonic event analysis application may review the data ledger in memory to determine if a second immediately preceding telephonic event was received. If no data corresponding to a second immediately preceding telephonic event exists in memory (e.g., only data corresponding to the first immediately preceding telephonic event exits in memory), the incoming telephonic event analysis application may determine that the incoming telephonic event is a second incoming telephonic event associated with the particular individual or entity and prevent the second incoming telephonic event from being displayed on the mobile device 120 at step 514. Additionally, the incoming telephonic event analysis application may provide a notification to the individual or entity associated with the second incoming telephonic event alerting the individual or entity that the user is still driving and unavailable to respond to the telephonic event, but if that it is an emergency situation, the individual or entity should provide a third telephonic event to be connected to the mobile device of the user. Furthermore, the incoming telephonic event analysis application may store the telephonic event data associated with the second telephonic event in memory in the data ledger associated with the active operative period of vehicle 110.

Conversely, if two or more previously stored telephonic event data entries exists in memory in the data ledger, the determination of the second immediately preceding telephonic event may be made. In instances in which a plurality of previously stored telephonic event data entries exists in the data ledger, the determination of the second immediately preceding telephonic event may be made based on a time difference between the time of receipt of the incoming telephonic event and previously stored receipt times corresponding to previously received telephonic events. The difference with the second smallest magnitude may be determined to be the second immediately preceding telephonic event.

At step 610A, after determining that a second immediately preceding telephonic event was received, the incoming telephonic event analysis application may compare the extracted name, telephone number, and user name (e.g., handle) from the incoming telephonic event to that of the second immediately preceding telephonic event to determine whether or not the incoming telephonic event and the second immediately preceding telephonic event share a common sending individual or entity. If it is determined that the incoming telephonic event and the second immediately preceding telephonic event do not share a common sending individual or entity, the incoming telephonic event analysis application may determine that the incoming telephonic event is a second incoming telephonic event associated with the particular individual or entity and prevent the second incoming telephonic event from being displayed on the mobile device 120 at step 514. Additionally, the incoming telephonic event analysis application may provide a notification to the individual or entity associated with the second incoming telephonic event alerting the individual or entity that the user is still driving and unavailable to respond to the telephonic event, but if that it is an emergency situation, the individual or entity should provide a third telephonic event to be connected to the mobile device of the user. Furthermore, the incoming telephonic event analysis application may store the telephonic event data associated with the second telephonic event in memory in the data ledger associated with the active operative period of vehicle 110.

Conversely, if it is determined that the incoming telephonic event and the second immediately preceding telephonic event share a common sending individual or entity, the incoming telephonic event analysis application may determine that the incoming telephonic event is at least a third incoming telephonic event associated with the particular sending individual or entity and, at step 516, the incoming telephonic event analysis application may determine whether or not the mobile device 120 was synced and/or paired with the hands-free device 116. At step 518, if the mobile device 120 was previously synced and/or paired with the hands-free device 116, the incoming telephonic event analysis application may activate the hands-free device 116, remove the soft block, and direct the incoming telephonic event on the mobile device 120 to hands-free device 116. Alternatively, at step 520, if the mobile device 120 was not previously synced and/or paired with the hands-free device 116, the incoming telephonic event analysis application may remove the soft block and display the incoming telephonic event on the mobile device 120.

Figure 6B:
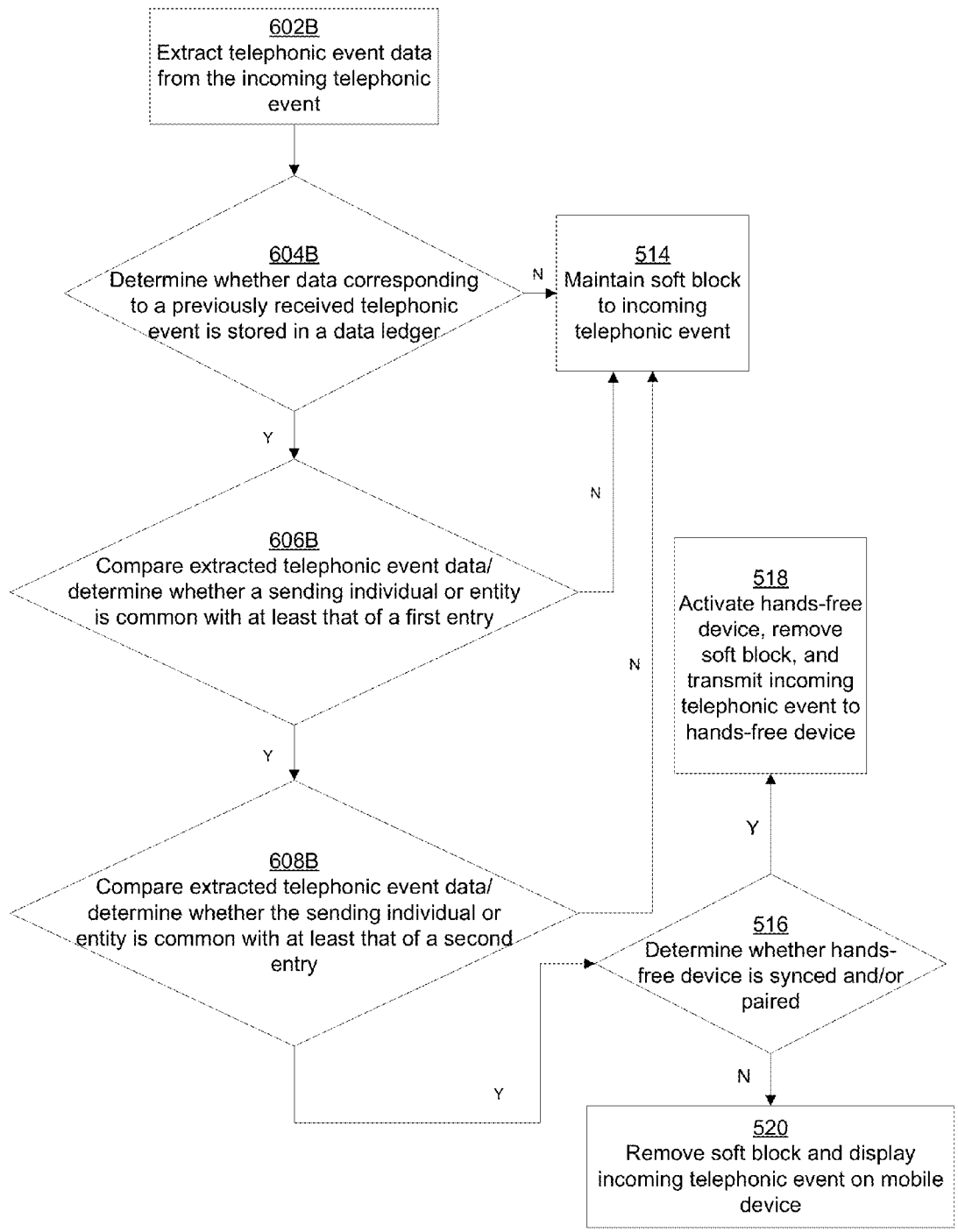
FIG. 6B is a flow diagram illustrating another example of an incoming telephonic event data analysis method according to one or more aspects of the disclosure.

FIG. 6B is a flow diagram illustrating another example of an incoming telephonic event data analysis method according to one or more aspects of the disclosure. At step 602B, the incoming telephonic event analysis application may extract telephonic event data from the incoming telephonic event. Such data may include a name, telephone number, user name (e.g., handle), event type (e.g., telephone call, text message, email, application notification, etc.), and time of receipt.

At step 604B, the incoming telephonic event analysis application may determine whether previously stored telephonic event data is stored in memory in the data ledger associated with the active operative period of vehicle 110. Data corresponding to previously received telephonic events may be previously stored in memory on mobile device 120 by the incoming telephonic event analysis application. In one instance, the stored previously received telephonic event data may correspond to an active operative period of vehicle 110, wherein the active operative is initiated by a positive ignition event (e.g., vehicle 110 is turned on). In such instances, mobile device 120 may be configured to receive indication of a positive ignition event from sensors 111, telematics device 113, and/or on-board computer 115 and the incoming telephonic event analysis application may be configured to create a data ledger within memory of mobile device 120 corresponding to the active operative period of vehicle 110. In one instance, the data ledger may be cleared and/or reset responsive to the conclusion of the active operative period through receipt of an indication of a negative ignition event (e.g., vehicle 110 is turned off). In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

However, in some cases, the active operating state of the vehicle 110 may be determined by a velocity, acceleration, and/or displacement magnitude and mobile device 120 may be configured to receive indication of such a magnitude from sensors 111, telematics device 113, and/or on-board computer 115 and the incoming telephonic event analysis application may be configured to create a data ledger within memory of mobile device 120 corresponding to the active operative period of vehicle 110. Similarly, the termination of an active operating state of the vehicle 110 may be determined by a prolonged period (e.g., 1 min, 5 min, 10 min, etc.) without a velocity, acceleration, and/or displacement magnitude.

In some instances, the start of an active operating state of the vehicle 110 may be determined by a negative parking brake indication (e.g., parking brake disengaged), a shift into reverse or drive after a prolonged period (e.g., 5 min, 10 min, 30 min, etc.) of being in park, a positive headlight activation, brake pedal activation, gas pedal activation, and/or a state change in one or more vehicle systems requiring user input. Conversely, the end of an active operating state of vehicle 110 may be determined by a positive parking brake indication (e.g., parking brake engagement), a shift into park, headlight deactivation, absence of brake pedal usage, gas pedal usage, and/or state change in one or more vehicle systems requiring user input. Additionally, such state changes may be time constrained. Similar to the state changes noted above, mobile device 120 may be configured to receive indication of such state changes from sensors 111, telematics device 113, and/or on-board computer 115.

If no data corresponding to a previously received telephonic event exists in memory, the incoming telephonic event analysis application may determine that the incoming telephonic event is a first incoming telephonic event. If the incoming telephonic event is determined to be a first incoming telephonic event, incoming telephonic event analysis application may maintain the soft block and prevent the first incoming telephonic event from being displayed on the mobile device 120 at step 514. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if data corresponding to one or more previously received telephonic events is stored in memory in the data ledger associated with the active operative period of vehicle 110, the incoming telephonic event analysis application may consolidate the previously stored telephonic event data based on a retroactive time window, wherein the previously stored telephonic event data comprised within the consolidated window may be marked for further comparison with the telephonic event data of the incoming telephonic event. The retroactive time window may be a predetermined period of time (e.g., 1 minute, 5 minutes, 30 minutes, etc.) extending into the past from the time at which the incoming telephonic event was received at mobile device 120. For example, if previously stored telephonic event data exists in memory in the data ledger and an incoming telephonic event is received at 3:00 PM EST, the retroactive time window may extend into the past until 2:55 PM EST. Each telephonic event received between 2:55 PM EST and 3:00 PM EST may be isolated by the incoming telephonic event analysis application from the remainder of the previously stored telephonic event data received outside of the retroactive time window and marked for further comparison.

At step 606B, after isolating previously stored telephonic event data within the retroactive time window, the incoming telephonic event analysis application may compare the extracted name, telephone number, and user name (e.g., handle) from the incoming telephonic event to that of each of the previously stored telephonic event data entries in the consolidated time window to determine whether or not the incoming telephonic event and any of the previously stored telephonic event data entries share a common sending individual or entity. If it is determined that the incoming telephonic event and any of the previously stored telephonic event data entries do not share a common sending individual or entity, the incoming telephonic event analysis application may determine that the incoming telephonic event is a first incoming telephonic event associated with a particular sending individual or entity. After such a determination, the incoming telephonic event analysis application may maintain the soft block and prevent the first incoming telephonic event from being displayed on the mobile device 120 at step 514. Additionally, the incoming telephonic event analysis application may provide a notification to the individual or entity associated with the first incoming telephonic event that the user is driving and currently unavailable to respond to the telephonic event. Furthermore, the incoming telephonic event analysis application may store the telephonic event data associated with the first telephonic event in memory in the data ledger associated with the active operative period of vehicle 110.

Conversely, if it is determined that the incoming telephonic event and at least a first entry of the previously stored telephonic event data entries in the retroactive window share a common sending individual or entity, the incoming telephonic event analysis application may determine that the incoming telephonic event is at least a second incoming telephonic event associated with the particular individual or entity and may proceed to step 608B.

At step 608B, the incoming telephonic event analysis application may compare the extracted name, telephone number, and user name (e.g., handle) from the incoming telephonic event to that of each of the previously stored telephonic event data entries in the consolidated time window (besides the first entry sharing the common individual or entity determined in step 606B) to determine whether or not the incoming telephonic event and a second entry of the previously stored telephonic event data entries share a common sending individual or entity. If it is determined that the incoming telephonic event and none of the remainder of the previously stored telephonic event data entries share a common sending individual or entity, the incoming telephonic event analysis application may determine that the incoming telephonic event is a second incoming telephonic event associated with a particular sending individual or entity. After such a determination, the incoming telephonic event analysis application may maintain the soft block and prevent the second incoming telephonic event from being displayed on the mobile device 120 at step 514. Additionally, the incoming telephonic event analysis application may provide a notification to the individual or entity associated with the second incoming telephonic event that the user is driving and currently unavailable to respond to the telephonic event. Furthermore, the incoming telephonic event analysis application may store the telephonic event data associated with the second telephonic event in memory in the data ledger associated with the active operative period of vehicle 110.

Conversely, if it is determined that the incoming telephonic event and at least a second entry of the previously stored telephonic event data entries in the retroactive window share a common sending individual or entity, the incoming telephonic event analysis application may determine that the incoming telephonic event is at least a third incoming telephonic event associated with the particular sending individual or entity and, at step 516, the incoming telephonic event analysis application may determine whether or not the mobile device 120 was synced and/or paired with the hands-free device 116. At step 518, if the mobile device 120 was previously synced and/or paired with the hands-free device 116, the incoming telephonic event analysis application may activate the hands-free device 116, remove the soft block, and direct the incoming telephonic event on the mobile device 120 to hands-free device 116. Alternatively, at step 520, if the mobile device 120 was not previously synced and/or paired with the hands-free device 116, the incoming telephonic event analysis application may remove the soft block and display the incoming telephonic event on the mobile device 120.

After the active operative period of vehicle 110 has been terminated and an indication of such has been received at mobile device 120, the incoming telephonic event analysis application may display a rollup on the mobile device 120 of the driver comprising each of the incoming telephonic events blocked from being displayed on mobile device 120 during driving. The rollup may include each of the data entries stored in the data ledger in memory. As such, each of the telephonic events received during operation of vehicle 110, the type of each of the telephonic events, the individual or entity associated with the each of the telephonic events, an indication of availability of each of the individuals or entities associated with each of the telephonic events, and the time of receipt of each of the telephonic events. In some instances, the driver may be able to select each of the telephonic events comprised in the rollup to respond to the telephonic event in the manner corresponding to the event type (e.g., telephone call, email, text message, application specific interface, etc.). Alternatively, the driver may be able to select from the totality of telephonic event types in responding to the received telephonic event.

In some instances, the incoming telephonic event analysis application may be configured to cleared and/or reset the data ledger responsive to the conclusion of the active operative period through receipt of a state change event from sensors 111, telematics device 113, and/or on-board computer 115. In doing so, memory of mobile device 120 may be actively conserved as related to the incoming telephonic event application. Alternatively, the data ledger may be achieved responsive to the conclusion of the active operative period through receipt of an indication of a negative ignition event and may be accessible at a later time.

In examples in which the analysis of the incoming telephonic event is performed by on-board computer 115 and/or incoming telephonic event analysis system 140, mobile device 120 may transmit incoming telephonic event data to on-board computer 115 and/or incoming telephonic event analysis system 140. Such data may include the individual or entity associated with incoming telephonic event, time of receipt of the incoming telephonic event, and the type of the incoming telephonic event. Upon receipt of the incoming telephonic event data, on-board computer 115 and incoming telephonic event analysis system 140, alone or in combination, may be able to perform the determination features outlined above in steps 508, 510, and 512 (e.g., FIGS. 6A and 6B). Responsive to performing the respective determination steps, on-board computer 115 and incoming telephonic event analysis system 140, either alone or in combination, may be configured to transmit the results of such steps to mobile device 120.

Figure 7:
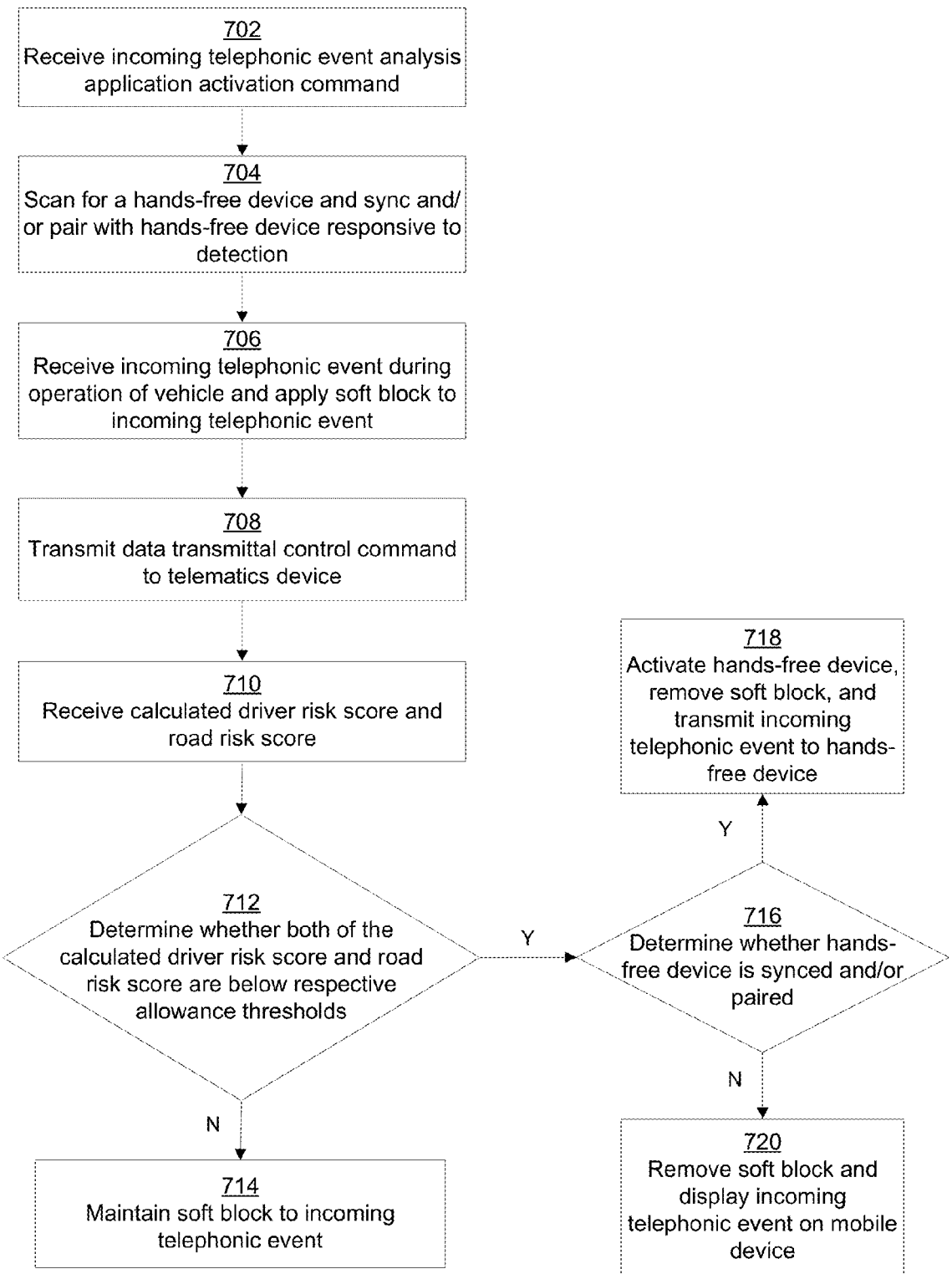
FIG. 7 is a flow diagram illustrating another example of an incoming telephonic event analysis method based on the presence of a hands-free device according to one or more aspects of the disclosure.

FIG. 7 is a flow diagram illustrating another example of an incoming telephonic event analysis method based on the presence of a hands-free device according to one or more aspects of the disclosure. As will be described below, the processes of the incoming telephonic event analysis method may be performed by any one, or combination of, mobile device 120, on-board computer 115, and incoming telephonic event analysis system 140.

At step 702, the mobile device 120 may receive an incoming telephonic event analysis application activation command from on-board computer 115, which may send the activation command in response to receiving a positive vehicle ignition event (e.g., turning vehicle on) and/or any one, or combination of, state change events described above. Responsive to receiving the incoming telephonic event analysis application activation command, mobile device 120 may activate the incoming telephonic event analysis application.

At step 704, after the incoming telephonic event analysis application has been activated on mobile device 120 responsive to the command sent from vehicle on-board computer 115, the incoming telephonic event analysis application may cause the mobile device 120 to scan for the presence of a hands-free device 116 in the proximity of mobile device 120. In the event that a hands-free device 116 is registered during the scan conducted by mobile device 120, the incoming telephonic event analysis application may instruct the mobile device 120 to sync and/or pair with the hands-free device 116. Alternatively, if a hands-free device 116 is not registered during the scan, no instruction to sync and/or pair may be given to mobile device At step 706, the mobile device 120 associated with the driver of vehicle 110 may receive an incoming telephonic event during the operation of vehicle 110. The incoming telephonic event may be of any of a plurality of telephonic event types. Upon receipt of the incoming telephonic event, an incoming telephonic event analysis application operating on mobile device 120 may apply a soft block to the incoming telephonic event preventing the event from being displayed on the mobile device 120.

At step 708, the mobile device 120 may transmit a data transmittal control command to telematics device 113. The data transmittal control command may be configured to activate telematics device 113 and may further include instructions for the telematics device 120 to transmit specific data elements of the vehicle operational data and environmental conditions data to incoming telephonic event analysis system 140 corresponding to the time of receipt of the incoming telephonic event. The specific data elements within the broader categories of vehicle operational data and environmental conditions data may coincide with data elements required by driver score/risk map server 170 to perform the calculations of the driver risk score and road risk score. Alternatively, the data transmittal control command may include instructions for telematics device 113 to transmit the specific data elements to mobile device 120. In such instances, the incoming telephonic event analysis application on mobile device 120 may be configured to perform the driver risk score and road risk score calculations described below in regards to driver score/risk map server 170.

In response to receiving the specific data elements of the vehicle operational data and environmental conditions data from telematics device 113, incoming telephonic event analysis system 140 may route the data to driver score/risk map server 170. The driver score/risk map server 170 may use the data in conjunction with historical data stored in driver score/risk map database 174 and auxiliary environmental conditions data provided by third party data source server 160 to perform the driver risk score and road risk score calculations. After performing the calculations, driver score/risk map server 170 may transmit the calculated driver risk score and road risk score to mobile device 120, which may be configured to receive the calculated driver risk score and road risk score at step 710.

At step 712, upon receiving the calculated driver risk score and road risk score from driver score/risk map server 170, the incoming telephonic event analysis application on mobile device 120 may determine whether or not to remove or to maintain the soft block applied to the incoming telephonic event. In doing so, the incoming telephonic event analysis application may compare both the driver risk score and the road risk score to allowance thresholds respective to the driver risk score and the road risk score. At step 716, if both of the driver score and the road risk score are below the respective allowance thresholds, the incoming telephonic event analysis application may then determine whether or not the mobile device 120 was synced and/or paired with the hands-free device 116. At step 518, if the mobile device 120 was previously synced and/or paired with the hands-free device 116, the incoming telephonic event analysis application may activate the hands-free device 116, remove the soft block, and direct the incoming telephonic event on the mobile device 120 to hands-free device 116. Alternatively, at step 720, if the mobile device 120 was not previously synced and/or paired with the hands-free device 116 because no hands-free device 116 was initially detected, the incoming telephonic event analysis application may remove the soft block and display the incoming telephonic event on the mobile device 120. Conversely, at step 714, if either of the driver risk score or the road risk score is above the respective allowance threshold, the incoming telephonic event analysis application may maintain the soft block and prevent the incoming telephonic event from being displayed on the mobile device 120 regardless of whether or not the mobile device 120 was synced and/or paired with hands-free device 116.

In some instances, after driving has been completed and vehicle 110 is turned off, vehicle control computer 115 may deactivate the incoming telephonic event analysis application on mobile device 120. By activating and deactivating the incoming telephonic event analysis application in response to a vehicle ignition event (e.g., turning vehicle on or off), the battery and processing power of mobile device 120 may be conserved by ensuring that the utilization of the incoming telephonic event analysis application coincides with periods of operation of vehicle 110. Additionally, the usage of the vehicle ignition event to trigger the incoming telephonic event analysis application may restrict the operation of the application to periods of driving and prevent operation carry over between periods of driving and periods of non-driving.

In some instances, when the soft block is removed by the incoming telephonic event analysis application and the incoming telephonic event is displayed on mobile device 120, the driver associated with mobile device 120 may be awarded points for not interacting with the mobile device 120 in response to the displayed telephonic event. Such points may be used by the driver associated with mobile device 120 to incrementally increase the predetermined vehicle velocity threshold and/or add additional individuals or entities to the allowable individual or entity list. For example, for every incoming telephonic event displayed on mobile device 120 that is not interacted with by the driver of vehicle 110, one point may be awarded to the driver. After 100 points have been awarded, the driver may be able to increase the velocity threshold by 0.1 mph. Alternatively, after 1000 points have been awarded, the driver may be able to add an additional individual or entity to the allowable individual or entity list. In some instances, the driver may receive electronic badges after surpassing certain point thresholds (e.g., 100 points, 500 points, etc.).

After operation of vehicle 110 has been terminated, the incoming telephonic event analysis application may provide the driver associated with mobile device 110 with a rollup comprising each of the incoming telephonic events blocked from being displayed on mobile device 120 during driving. The rollup may include each of the telephonic events received during operation of vehicle 110, the type of each of the telephonic events, the individual or entity associated with the each of the telephonic events, an indication of availability of each of the individuals or entities associated with each of the telephonic events, and the time of receipt of each of the telephonic events. In some instances, the driver may be able to select each of the telephonic events comprised in the rollup to respond to the telephonic event in the manner corresponding to the event type (e.g., telephone call, email, text message, application specific interface, etc.). Alternatively, the driver may be able to select from the totality of telephonic event types in responding to the received telephonic event.

FIG. 8 illustrates a block diagram of a computing device 801 in an auto-reply and hands-free system 600 that may be used according to one or more illustrative embodiments of the disclosure. The computing device 801 may have a processor 803 for controlling overall operation of the computing device 801 and its associated components, including RAM 805, ROM 807, input/output module 809, and memory unit 815. The computing device 801, along with one or more additional devices (e.g., terminals 841, 851) may correspond to any of multiple systems or devices, such as auto-reply and hands-free systems, configured as described herein for analyzing an incoming telephonic event in relation to a combination of vehicle operational data, user preferences, and hands-free device activation to determine if the incoming telephonic event is to be allowed to be received during vehicle operation.

Input/Output (I/O) module 809 may include a microphone, keypad, touch screen, and/or stylus through which a user of the computing device 801 may provide input, and may also include one or more of a speaker for providing audio input/output and a video display device for providing textual, audiovisual and/or graphical output. Software may be stored within memory unit 815 and/or other storage to provide instructions to processor 803 for enabling device 801 to perform various functions. For example, memory unit 815 may store software used by the device 801, such as an operating system 817, application programs 819, and an associated internal database 821. The memory unit 815 includes one or more of volatile and/or non-volatile computer memory to store computer-executable instructions, data, and/or other information. Processor 803 and its associated components may allow the computing device 801 to execute a series of computer-readable instructions to perform the methods described in FIGS. 2-7.

The computing device 801 may operate in a networked environment 800 supporting connections to one or more remote computers, such as terminals/devices 841 and 851. Computing device 801, and related terminals/devices 841 and 851, may include devices installed in vehicles, mobile devices that may travel within vehicles, or devices outside of vehicles that are configured to receive and process vehicle and other sensor data. Thus, the computing device 801 and terminals/devices 841 and 851 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 801. The network connections depicted in FIG. 8 include a local area network (LAN) 825 and a wide area network (WAN) 829, and a wireless telecommunications network 833, but may also include other networks. When used in a LAN networking environment, the computing device 801 may be connected to the LAN 825 through a network interface or adapter 823. When used in a WAN networking environment, the device 801 may include a modem 827 or other means for establishing communications over the WAN 829, such as network 831 (e.g., the Internet). When used in a wireless telecommunications network 833, the device 801 may include one or more transceivers, digital signal processors, and additional circuitry and software for communicating with wireless computing devices 841 (e.g., mobile phones, short-range vehicle communication systems, vehicle sensing and telematics devices) via one or more network devices 835 (e.g., base transceiver stations) in the wireless network 833.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and auto-reply and hands-free components described herein may be configured to communicate using any of these network protocols or technologies.

Additionally, one or more application programs 819 used by the computing device 801 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a mobile device, an incoming telephonic event analysis application activation command from an on-board computer of a vehicle;
   activating an incoming telephonic event analysis application responsive to the incoming telephonic event analysis application activation command from the on-board computer of the vehicle;
   instructing the mobile device to pair with a hands-free device by the incoming telephonic event analysis application operating on the mobile device, wherein the mobile device is associated with a driver of the vehicle;
   receiving an incoming telephonic event at the mobile device;
   applying a soft block to the incoming telephonic event by the incoming telephonic event analysis application based on an active operative state of the vehicle;
   determining, by the incoming telephonic event analysis application, whether a velocity of the vehicle at a time of receipt of the incoming telephonic event is less than a predetermined velocity threshold;
   determining, by the incoming telephonic event analysis application, whether the incoming telephonic event is associated with an allowable individual or entity;
   determining, by the incoming telephonic event analysis application, whether the incoming telephonic event is a first, second, or third incoming telephonic event; and
   based on at least one of the velocity of the vehicle at the time of receipt of the incoming telephonic event being less than the predetermined velocity threshold, the incoming telephonic event being associated with the allowable individual or entity, and the incoming telephonic event being the third incoming telephonic event, removing the soft block on the incoming telephonic event by the incoming telephonic event analysis application;
   in response to removing the soft block on the incoming telephonic event, activating the hands-free device paired with the mobile device; and
   transmitting the incoming telephonic event to the activated hands-free device.

2. The method of claim 1, wherein determining whether the velocity of the vehicle at the time of receipt of the incoming telephonic event is less than the predetermined velocity threshold includes:
   requesting vehicle velocity data corresponding to the time of receipt of the incoming telephonic from one or more of a vehicle sensor, GPS device, telematics device, on-board computer, and incoming telephonic event analysis system;
   receiving the requested vehicle velocity data corresponding to the time of receipt of the incoming telephonic from one or more of the vehicle sensor, GPS device, telematics device, on-board computer, and incoming telephonic event analysis system; and
   comparing the received vehicle velocity data corresponding to the time of receipt of the incoming telephonic to the predetermined velocity threshold.

3. The method of claim 1, further comprising:
receiving, at the mobile device, an incoming telephonic event analysis application deactivation command from the on-board computer of the vehicle; and
deactivating the incoming telephonic event analysis application responsive to the incoming telephonic event analysis application deactivation command from the on-board computer of the vehicle.

4. The method of claim 3, wherein the incoming telephonic event analysis application activation command is associated with a positive vehicle ignition event of the vehicle and wherein the incoming telephonic event analysis application deactivation command is associated with a negative vehicle ignition event of the vehicle.

5. The method of claim 1, further comprising:
responsive to removing the soft block on the incoming telephonic event, displaying the incoming telephonic event on the mobile device; and
allowing the driver to respond to the incoming telephonic event.

6. The method of claim 5, wherein allowing the driver to respond to the incoming telephonic event includes:
allowing the driver to respond to the incoming telephonic event for a predetermined period of time; and
providing the driver with countdown updates corresponding to a termination of the predetermined period of time.

7. The method of claim 1, wherein the hands-free device is one of a hands-free headphone, headset, and in-ear device.

8. The method of claim 1, wherein the active operative state of the vehicle corresponds to a state in which an engine of the vehicle is turned on.

9. An apparatus comprising:
a processor; and
memory storing computer readable instructions that, when executed by the processor, cause the apparatus to:
receive an incoming telephonic event analysis application activation command from an on-board computer of a vehicle;
activate and incoming telephonic event analysis application responsive to the incoming telephonic event analysis application activation command from the on-board computer of the vehicle;
pair the apparatus with a hands-free device by the incoming telephonic event analysis application operating on the apparatus, wherein the apparatus is associated with a driver of the vehicle;
receive an incoming telephonic event at the apparatus;
apply a soft block to the incoming telephonic event by the incoming telephonic event analysis application operating on the apparatus based on an active operative state of the vehicle;
determine, by the incoming telephonic event analysis application, whether a velocity of the vehicle at a time of receipt of the incoming telephonic event is less than a predetermined velocity threshold;
determine, by the incoming telephonic event analysis application, whether the incoming telephonic event is associated with an allowable individual or entity;
determine, by the incoming telephonic event analysis application, whether the incoming telephonic event is a first, second, or third incoming telephonic event; and
based on at least one of the velocity of the vehicle at the time of receipt of the incoming telephonic event being less than the predetermined velocity threshold, the incoming telephonic event being associated with the allowable individual or entity, and the incoming telephonic event being the third incoming telephonic event, remove the soft block on the incoming telephonic event by the incoming telephonic event analysis application;
in response to removing the soft block on the incoming telephonic event, activate the hands-free device paired with the apparatus; and
transmit the incoming telephonic event to the activated hands-free device.

10. The apparatus of claim 9, wherein the memory stores further computer readable instructions that, when executed by the processor, cause the apparatus to:
request vehicle velocity data corresponding to the time of receipt of the incoming telephonic from one or more of a vehicle sensor, GPS device, telematics device, on-board computer, and incoming telephonic event analysis system;
receive the requested vehicle velocity data corresponding to the time of receipt of the incoming telephonic from one or more of the vehicle sensor, GPS device, telematics device, on-board computer, and incoming telephonic event analysis system; and
compare the received vehicle velocity data corresponding to the time of receipt of the incoming telephonic to the predetermined velocity threshold.

11. The apparatus of claim 9, wherein the memory stores further computer readable instructions that, when executed by the processor, cause the apparatus to:
receive an incoming telephonic event analysis application deactivation command from the on-board computer of the vehicle; and
deactivate the incoming telephonic event analysis application responsive to the incoming telephonic event analysis application deactivation command from the on-board computer of the vehicle.

12. The apparatus of claim 11, wherein the incoming telephonic event analysis application activation command is associated with a positive vehicle ignition event of the vehicle and wherein the incoming telephonic event analysis application deactivation command is associated with a negative vehicle ignition event of the vehicle.

13. The apparatus of claim 9, wherein the memory stores further computer readable instructions that, when executed by the processor, cause the apparatus to:
responsive to removing the soft block on the incoming telephonic event, display the incoming telephonic event on the apparatus; and
allow the driver to respond to the incoming telephonic event.

14. The apparatus of claim 13, wherein the memory stores further computer readable instructions that, when executed by the processor, cause the apparatus to:
allow the driver to respond to the incoming telephonic event for a predetermined period of time; and
provide the driver with countdown updates corresponding to a termination of the predetermined period of time.

15. The apparatus of claim 9, wherein the hands-free device is one of a hands-free headphone, headset, and in-ear device.

* * * * *